US012686623B2

(12) United States Patent
Wang

(10) Patent No.: US 12,686,623 B2
(45) Date of Patent: Jul. 21, 2026

(54) CLEANING DEVICE

(71) Applicant: XINGMAI INNOVATION TECHNOLOGY (SUZHOU) CO., LTD., Suzhou (CN)

(72) Inventor: Shengle Wang, Suzhou (CN)

(73) Assignee: XINGMAI INNOVATION TECHNOLOGY (SUZHOU) CO., LTD., Suzhou (CN)

( * ) Notice: Subject to any disclaimer, the term of this patent is extended or adjusted under 35 U.S.C. 154(b) by 0 days.

(21) Appl. No.: 19/399,738

(22) Filed: Nov. 25, 2025

(65) Prior Publication Data

US 2026/0152415 A1     Jun. 4, 2026

(30) Foreign Application Priority Data

Nov. 29, 2024   (WO) ................ PCT/CN2024/135845
Dec. 6, 2024    (WO) ................ PCT/CN2024/137628
Jan. 6, 2025    (WO) ................ PCT/CN2025/070882

(51) Int. Cl.
    *A46B 13/02*          (2006.01)
    *A46B 5/00*           (2006.01)
        (Continued)

(52) U.S. Cl.
    CPC ............ *C02F 1/001* (2013.01); *A46B 5/0012* (2013.01); *A46B 13/001* (2013.01); *A46B 13/02* (2013.01);
        (Continued)

(58) Field of Classification Search
    CPC .................. C02F 1/001; C02F 2103/42; C02F 2201/008; A46B 5/0012; A46B 13/001;
        (Continued)

(56) References Cited

U.S. PATENT DOCUMENTS 5,435,031 A * 7/1995 Minami ................ E04H 4/1654
                                                        15/1.7
6,594,844 B2   7/2003 Jones
                    (Continued)

FOREIGN PATENT DOCUMENTS

CN          102943576 A  *  2/2013
CN          209585732 U  *  11/2019
                    (Continued)

OTHER PUBLICATIONS

Machine translation of CN_102943576_A, 2013-02-07. (Year: 2013).*
                    (Continued)

*Primary Examiner* — Joseph W Drodge
(74) *Attorney, Agent, or Firm* — Soleado Law, PC

(57) ABSTRACT

The present disclosure provides a cleaning device, including: a device body; a traveling mechanism. The traveling mechanism includes a cover plate. A hollow structure is formed on at least a part of the cover plate and is configured to allow liquid to flow out of internal space of the traveling mechanism. A camera unit is disposed on a front side of the cleaning device. A supplement part is disposed close to the camera unit. The camera unit and a first identification assembly are disposed on the front side of the cleaning device at different heights. The cleaning device further includes at least one topography detection assembly configured to detect a topography of the to-be-cleaned surface under the device body. In this way, environment sensing capability of the cleaning device can be improved, and therefore, the cleaning device can be controlled more precisely.

20 Claims, 10 Drawing Sheets

(51) Int. Cl.

| | |
|---|---|
| *A46B 13/00* | (2006.01) |
| *C02F 1/00* | (2023.01) |
| *E04H 4/16* | (2006.01) |
| *G03B 15/03* | (2021.01) |
| *H04N 23/74* | (2023.01) |
| *C02F 103/42* | (2006.01) |

(52) U.S. Cl.

CPC .... *E04H 4/1654* (2013.01); *A46B 2200/3073* (2013.01); *C02F 2103/42* (2013.01); *C02F 2201/008* (2013.01); *G03B 15/03* (2013.01); *H04N 23/74* (2023.01)

(58) Field of Classification Search

CPC ............ A46B 13/02; A46B 2200/3073; E04H 4/1654; E04H 4/12; E04H 4/1209; E04H 4/1218; G03B 15/03; H04N 23/74

See application file for complete search history.

(56) References Cited

U.S. PATENT DOCUMENTS

| | | | |
|---|---|---|---|
| 10,954,683 B2 | 3/2021 | Adlivankin et al. | |
| 11,880,207 B2 * | 1/2024 | Durvasula | G05D 1/0038 |
| 12,529,237 B2 * | 1/2026 | Wang | E04H 4/1654 |
| 2013/0091641 A1 | 4/2013 | Ben Zion | |
| 2013/0152970 A1 | 6/2013 | Porat | |
| 2013/0318727 A1 * | 12/2013 | Garti | E04H 4/1654 |
| | | | 901/1 |
| 2015/0267433 A1 * | 9/2015 | Leonessa | G01C 15/002 |
| | | | 701/28 |
| 2016/0060887 A1 | 3/2016 | Tryber et al. | |
| 2016/0145884 A1 * | 5/2016 | Erlich | E04H 4/1654 |
| | | | 15/1.7 |
| 2018/0066443 A1 | 3/2018 | Zerweck et al. | |
| 2018/0073265 A1 | 3/2018 | Goldenberg et al. | |
| 2020/0095792 A1 | 3/2020 | Miller et al. | |
| 2022/0112735 A1 | 4/2022 | Besnier et al. | |
| 2023/0374807 A1 | 11/2023 | Liu et al. | |

FOREIGN PATENT DOCUMENTS

| | | | | | |
|---|---|---|---|---|---|
| CN | 111003111 | A | 4/2020 | | |
| CN | 114059811 | A | 2/2022 | | |
| CN | 114504282 | A | 5/2022 | | |
| CN | 115104954 | A | 9/2022 | | |
| CN | 218709488 | U | 3/2023 | | |
| CN | 116201403 | A | 6/2023 | | |
| CN | 219118889 | U | 6/2023 | | |
| CN | 116594411 | A | 8/2023 | | |
| CN | 116607827 | A | 8/2023 | | |
| CN | 219447294 | U | 8/2023 | | |
| CN | 117120696 | A | 11/2023 | | |
| CN | 219948386 | U | 11/2023 | | |
| CN | 117364727 | A | 1/2024 | | |
| CN | 221838056 | U | 10/2024 | | |
| CN | 221879018 | U | 10/2024 | | |
| CN | 118933413 | A | 11/2024 | | |
| EP | 2813645 | B1 * | 5/2016 | .......... | E04H 4/1654 |
| EP | 3521532 | A1 | 8/2019 | | |
| ES | 2630212 | T3 * | 8/2017 | .......... | E04H 4/1654 |
| KR | 20140052413 | A | 5/2014 | | |
| KR | 101416657 | B1 | 7/2014 | | |
| WO | WO-2016137886 | A1 * | 9/2016 | .......... | E04H 4/1654 |
| WO | 2023165069 | A1 | 9/2023 | | |

OTHER PUBLICATIONS

English translation of CN_209585732U, published Nov. 5, 2019. (Year: 2019).*

Partial Search Report for (EP25218182.1).

International Search Report and Written Opinion(PCT/CN2025/070882).

International Search Report and Written Opinion(PCT/CN2024/135845).

International Search Report and Written Opinion(PCT/CN2024/137628).

* cited by examiner

140

1000

CLEANING DEVICE

CROSS-REFERENCE TO RELATED APPLICATIONS

This application claims priority to International Patent Application No. PCT/CN2025/070882, filed with the World Intellectual Property Organization on Jan. 6, 2025, which claims priority to: International Patent Application No. PCT/CN2024/135845, filed with the World Intellectual Property Organization on Nov. 29, 2024, International Patent Application No. PCT/CN2024/100765, filed with the World Intellectual Property Organization on Jun. 21, 2024, International Patent Application No. PCT/CN2024/094025, filed with the World Intellectual Property Organization on May 17, 2024, Chinese Patent Application No. CN202410362217.0, filed with the China National Intellectual Property Administration on Mar. 27, 2024, International Patent Application No. PCT/CN2024/076021, filed with the World Intellectual Property Organization on Feb. 5, 2024, and Chinese Patent Application No. CN202410070430.4, filed with the China National Intellectual Property Administration on Jan. 17, 2024, which are incorporated herein by reference in their entireties.

This application claims priority to International Patent Application No. PCT/CN2024/137628, filed with the World Intellectual Property Organization on Dec. 6, 2024, which claims priority to: Chinese Patent Applications No. CN202323322296.2 and No. CN202311666132.3, filed with the China National Intellectual Property Administration on Dec. 6, 2023, International Patent Application No. PCT/CN2023/136911, filed with the World Intellectual Property Organization on Dec. 6, 2023, Chinese Patent Application No. CN202323471851.8, filed with the China National Intellectual Property Administration on Dec. 19, 2023, Chinese Patent Application No. CN202410070430.4, filed with the China National Intellectual Property Administration on Jan. 17, 2024, Chinese Patent Application No. CN202410077690.4, filed with the China National Intellectual Property Administration on Jan. 18, 2024, International Patent Applications No. PCT/CN2024/076040, No. PCT/CN2024/076025, No. PCT/CN2024/076033, and No. PCT/CN2024/076021, filed with the World Intellectual Property Organization on Feb. 5, 2024, Chinese Patent Applications No. CN202420594249.9, No. CN202410350025.8, No. CN202410349874.1, No. CN202410350019.2, No. CN202410349870.3, No. CN202410350047.4, and No. CN202410350031.3, filed with the China National Intellectual Property Administration on Mar. 26, 2024, Chinese Patent Application No. CN202410417536.7, filed with the China National Intellectual Property Administration on Apr. 8, 2024, International Patent Application No. PCT/CN2024/087590, filed with the World Intellectual Property Organization on Apr. 12, 2024, and U.S. patent application Ser. No. 18/946,861, filed with the United States Patent and Trademark Office on Nov. 13, 2024, which are incorporated herein by reference in their entireties.

This application claims priority to International Patent Application No. PCT/CN2024/135845, filed with the World Intellectual Property Organization on Nov. 29, 2024, which claims priority to: Chinese Patent Application No. CN202311639354.6, filed with the China National Intellectual Property Administration on Dec. 1, 2023, Chinese Patent Application No. CN202410070430.4, filed with the China National Intellectual Property Administration on Jan. 17, 2024, Chinese Patent Application No. CN202410362217.0, filed with the China National Intellectual Property Administration on Mar. 27, 2024, International Patent Application No. PCT/CN2024/094025, filed with the World Intellectual Property Organization on May 17, 2024, and International Patent Application No. PCT/CN2024/100765, filed with the World Intellectual Property Organization on Jun. 21, 2024, which are incorporated herein by reference in their entireties.

TECHNICAL FIELD

The present disclosure relates to the technical field of operating devices used in liquid, and in particular to, a cleaning device.

BACKGROUND

With improvement of living standards of people, an increasing number of people choose swimming as a form of exercise that not only increases fun of life but also strengthens their physique. In addition, water quality of a swimming pool also attracts much attention.

In a related technology, a cleaning device specifically operating in water is usually used to clean the swimming pool to improve the water quality of the swimming pool. However, region topographies of the swimming pool are complex and diverse, and the existing cleaning device cannot identify a special region topography due to construction of the cleaning device. Consequently, the movement of the cleaning device is limited.

SUMMARY

The present disclosure provides a cleaning device, including a device body. The device body includes a traveling mechanism, a filtering box, and at least one debris inlet disposed on the device body. The debris inlet is disposed at a bottom or a side portion of the device body and is configured to allow water to enter the filtering box for filtration. The cleaning device further includes a main drive pump configured to provide power for the water to flow through the debris inlet and the filtering box. The traveling mechanism includes a cover plate. A hollow structure is formed on at least a part of the cover plate and is configured to allow liquid to flow out of internal space of the traveling mechanism. A camera unit disposed on a front side of the cleaning device, at least one light supplement part disposed close to the camera unit, and at least one first identification assembly disposed on the front side of the cleaning device are further disposed on the device body. The first identification assembly is configured to identify a distance between the cleaning device and an obstacle in front of the cleaning device. The camera unit and the first identification assembly are disposed on the front side of the cleaning device at different heights.

DETAILED DESCRIPTION

The following clearly and completely describes the technical solutions in embodiments of the present disclosure with reference to the accompanying drawings in embodiments of the present disclosure. Clearly, the described embodiments are merely some but not all of embodiments of the present disclosure. All other embodiments obtained by a person of ordinary skill in the art based on embodiments of the present disclosure without creative efforts shall fall within the protection scope of the present disclosure.

Figure 1:
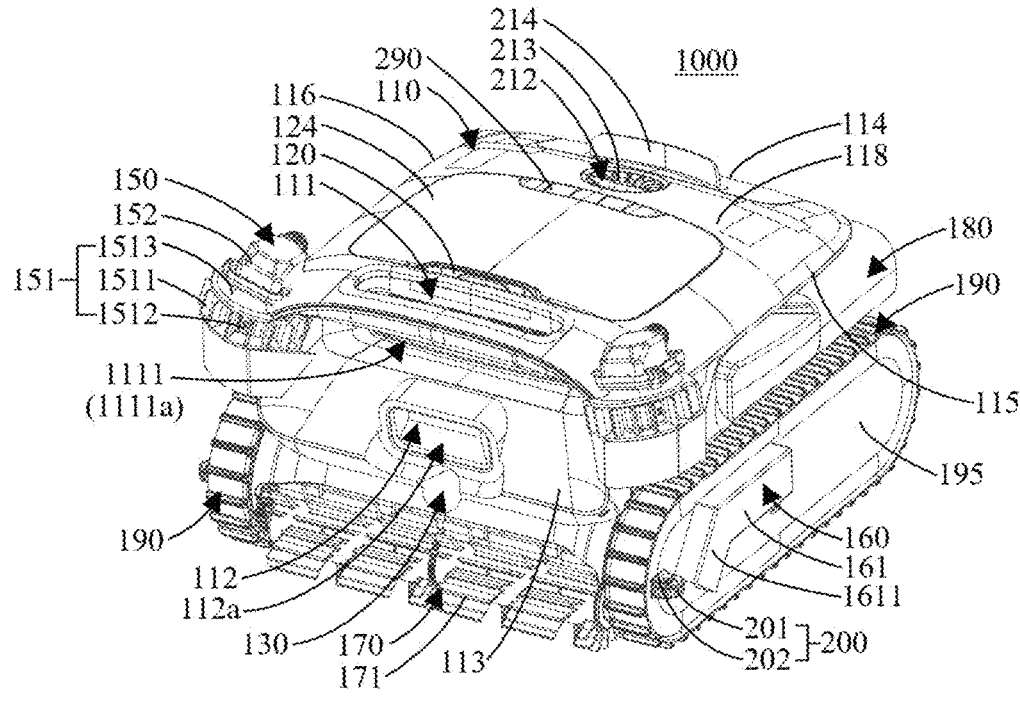
FIG. 1 is a schematic structural view of a cleaning device according to an embodiment of the present disclosure.
Figure 2:
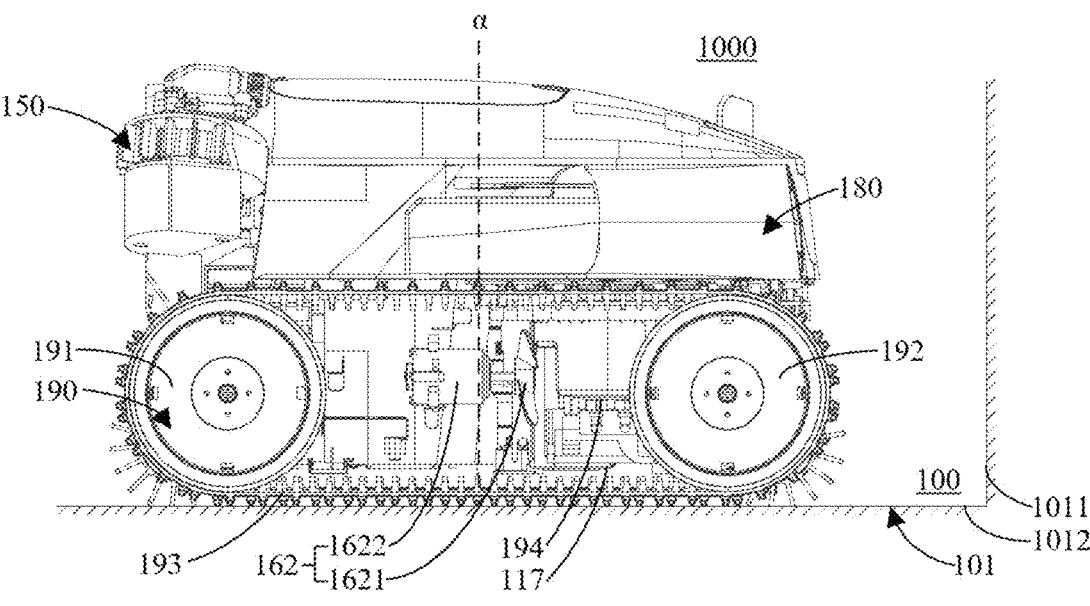
FIG. 2 is a schematic view of a cleaning device located on a target bottom wall of a target region according to the present disclosure.
Figure 3:
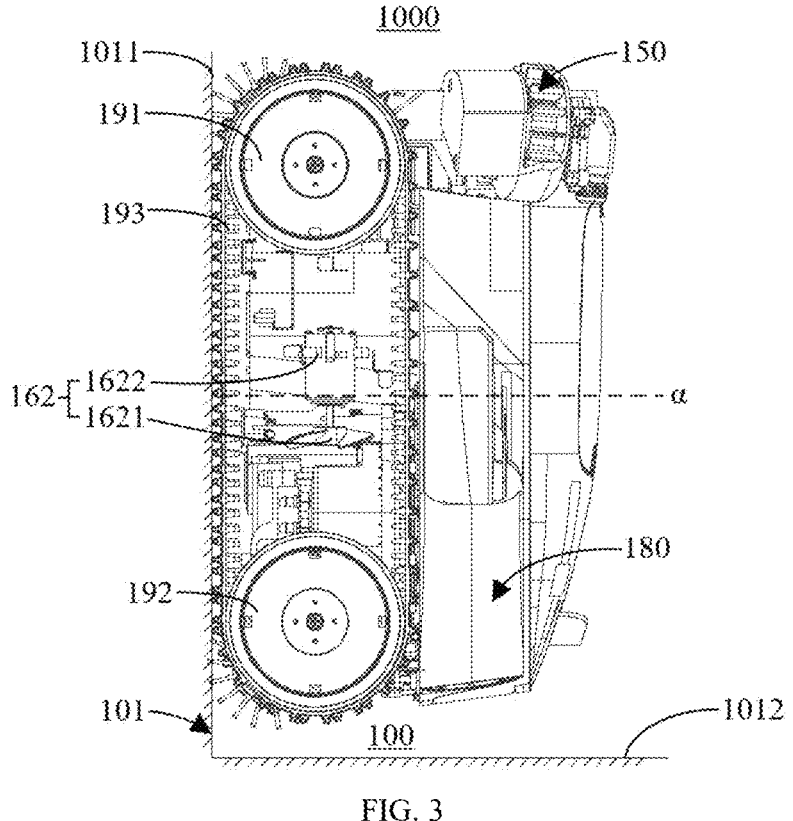
FIG. 3 is a schematic view of a cleaning device located on a target side wall of a target region according to the present disclosure.

Refer to FIG. 1 to FIG. 3. FIG. 1 is a schematic structural view of a cleaning device according to an embodiment of the present disclosure. FIG. 2 is a schematic view of a cleaning device located on a target bottom wall of a target region according to the present disclosure. FIG. 3 is a schematic view of a cleaning device located on a target side wall of a target region according to the present disclosure. The present disclosure provides a cleaning device 1000. The cleaning device 1000 may be a pool cleaning robot capable of cleaning a target region 100. The target region 100 may be a region at which the cleaning device 1000 performs cleaning. For example, the target region 100 may be a swimming pool, a pipe, a hull, an oil well, or the like, but is not limited thereto. The target region 100 includes a travel surface 101. The travel surface 101 is a part of a to-be-cleaned surface, and the part is in contact with a traveling mechanism 190. The travel surface 101 includes a target side wall 1011 and a target bottom wall 1012. In embodiments of the present disclosure, an example in which the cleaning device 1000 is used to clean a swimming pool is used for description. The target side wall 1011 may be a side wall of the swimming pool, and the target bottom wall 1012 may be a bottom wall of the swimming pool.

The cleaning device 1000 has a first side 113 and a second side 114 opposite to each other, a third side 115 and a fourth side 116 opposite to each other, and a fifth side 117 and a sixth side 118 opposite to each other. The first side 113 is located at a front portion of the cleaning device 1000. The second side 114 is located at a rear portion of the cleaning device 1000. The third side 115 is located on a left side of the cleaning device 1000. The fourth side 116 is located on a right side of the cleaning device 1000. The fifth side 117 is located at a bottom of the cleaning device 1000. The sixth side 118 is located at a top of the cleaning device 1000.

Figure 4:
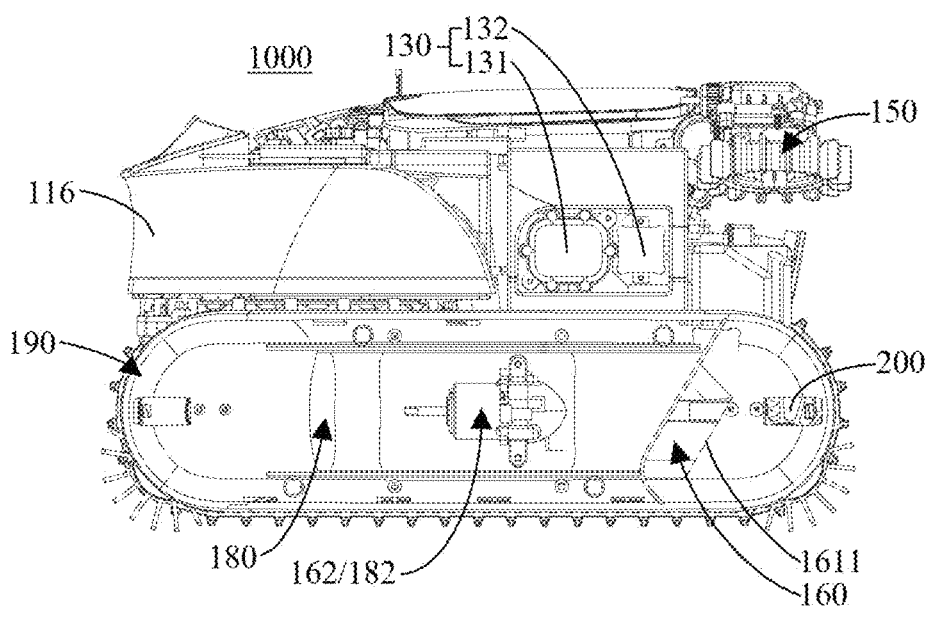
FIG. 4 is a side view of a cleaning device according to another embodiment of the present disclosure.
Figure 5:
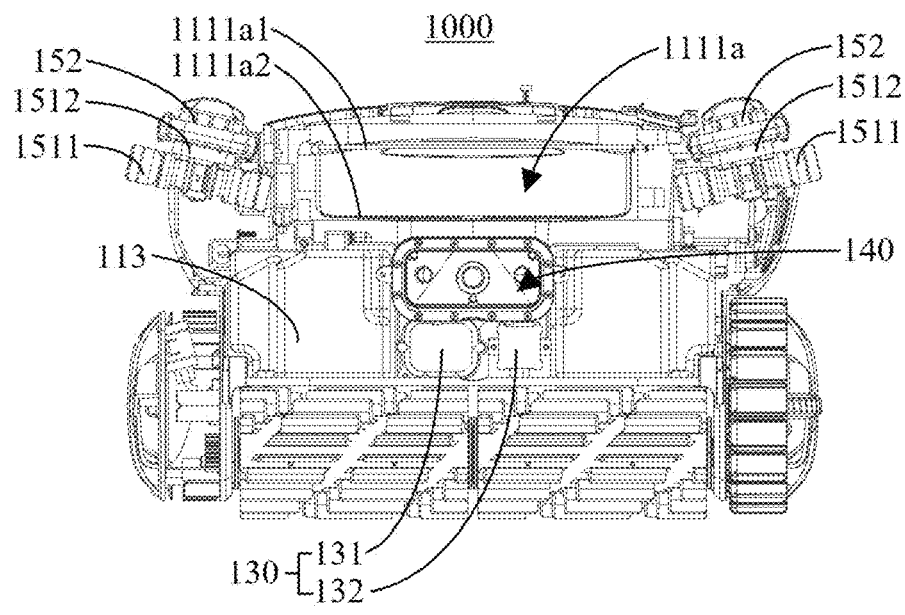
FIG. 5 is a main view of a cleaning device according to another embodiment of the present disclosure.

FIG. 4 is a side view of a cleaning device according to another embodiment of the present disclosure. FIG. 5 is a main view of a cleaning device according to another embodiment of the present disclosure. The cleaning device 1000 includes a cleaning device body 110. The cleaning device body 110 serves as a carrier for carrying other components of the cleaning device 1000, and the cleaning device body 110 may be a frame of the cleaning device 1000. The cleaning device 1000 further includes at least one debris inlet 1111, at least one filtering box 120, at least one group of identification assemblies 130, and a control system 231.

The at least one debris inlet 1111 is disposed on the cleaning device body 110, so that a dust-loaded water flow can enter the cleaning device body 110 through the debris inlet 1111. The at least one filtering box 120 may be detachably disposed in the cleaning device body 110. The filtering box 120 has a water flow inlet. The water flow inlet is in fluid communication with the at least one debris inlet 1111. The dust-loaded water flow in the target region 100 can enter the filtering box 120 through the debris inlet 1111 and the water flow inlet sequentially.

Figure 14:
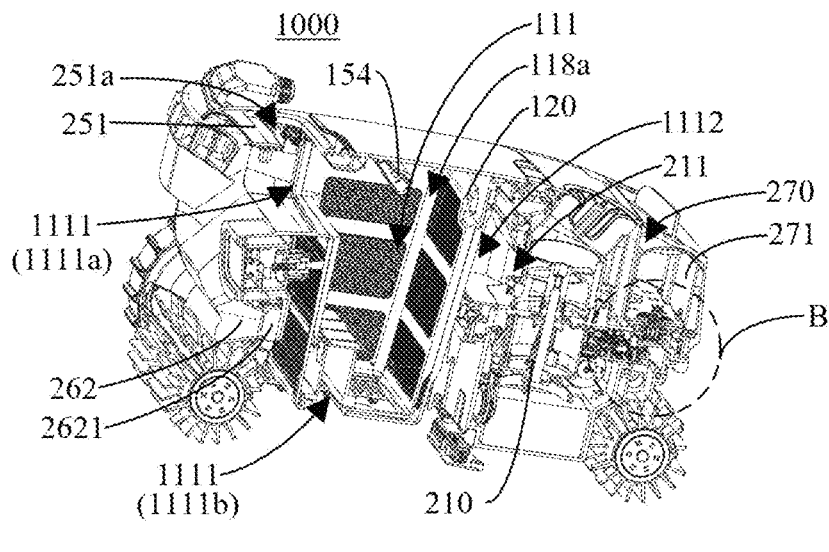
FIG. 14 is a sectional view of a cleaning device according to another embodiment of the present disclosure.

With reference to FIG. 14, the cleaning device body 110 includes a first accommodating cavity 111. The first accommodating cavity 111 communicates with an external environment through the debris inlet 1111, so that when the cleaning device 1000 enters the target region 100, the target region 100 communicates with the first accommodating cavity 111 through the debris inlet 1111. The filtering box 120 may be detachably disposed in the first accommodating cavity 111. The debris inlet 1111 is configured as an opening for the dust-loaded water flow outside the cleaning device body 110 to enter the filtering box 120, and the dust-loaded water flow is filtered by the filtering box 120 and then discharged from the cleaning device body 110, to clean the target region 100. The filtering box 120 is at least partially detachably accommodated in the first accommodating cavity 111, so that the filtering box 120 can be removed. This facilitates cleaning of trash in the filtering box 120.

The at least one group of identification assemblies 130 is disposed on a side surface of the cleaning device body 110, for example, one or more of the first side 113 to the sixth side 118, or at a joint between side surfaces of the cleaning device body 110, for example, a joint between the first side 113 and the third side 115, a joint between the second side 114 and the third side 115, a joint between the first side 113 and the fourth side 116, or a joint between the second side 114 and the fourth side 116. The identification assembly 130 is configured to identify an obstacle in the target region 100. The control system 231 is electrically connected to the at least one group of identification assemblies 130 to adjust an operation posture of the cleaning device 1000 based on information of the identification assemblies 130. The control system 231 may be disposed in the electronic control box 220 of the cleaning device 1000. A region inside the electronic control box 220 is closed or sealed.

During operation of the cleaning device 1000, the identification assembly 130 may detect, in real time, the wall topography of the target region 100 facing the identification assembly 130, and the control system 231 may adjust the operation posture of the cleaning device 1000 based on the wall topography identified by the identification assembly 130. In an embodiment, the identification assembly 130 is disposed on the third side 115 or the fourth side 116 of the cleaning device 1000. When the cleaning device 1000 moves along the target side wall 1011, and the identification assembly 130 identifies that the cleaning device 1000 moves at the curved target side wall 1011, the control system 231 may adjust a motion trajectory of the cleaning device 1000 to a trajectory corresponding to the curved side wall, and adjust the operation posture of the cleaning device 1000 based on the motion trajectory. In this way, the following case can be avoided: The cleaning device 1000 slips at the edge of the target side wall 1011, climbs in the height direction of the target side wall 1011, or directly hits the target side wall 1011, causing the cleaning device 1000 to overturn or be damaged. The identification assembly 130 is disposed, so that the cleaning device 1000 can safely move and perform cleaning along the edge. The identification assembly 130 may further identify a distance between the identification assembly 130 and a target side wall 1011 opposite to the identification assembly 130, so that the cleaning device 1000 can move and perform cleaning along the edge at a specific distance from the target side wall 1011. This prevents the cleaning device 1000 from scraping against the target side wall 1011.

The identification assembly 130 at least includes a first identification sub-part 131 and a second identification sub-part 132. The first identification sub-part 131 is different from and close to the second identification sub-part 132. The first identification sub-part 131 and the second identification sub-part 132 may be arranged left and right, arranged vertically, or arranged on one side surface in a staggered manner. The first identification sub-part 131 and the second identification sub-part 132 are disposed to expand an identification range, so that a special region topography can be identified more easily, and the control system 231 can adjust the operation posture of the cleaning device 1000 based on the region topography identified by the identification assembly 130, so that movement of the cleaning device 1000 is not limited by the diverse region topographies of the target region 100.

The cleaning device 1000 in a related technology cannot identify the curved target side wall 1011, causing the cleaning device 1000 to slip at the edge of the target side wall 1011, climb in the height direction of the target side wall 1011, or directly hit the target side wall 1011 when the cleaning device 1000 moves to the curved target side wall 1011. Consequently, the movement of the cleaning device 1000 is limited.

In some embodiments, the cleaning device 1000 includes two groups of identification assemblies 130. One group of identification assemblies 130 is disposed on the first side 113 of the cleaning device body 110. The other group of identification assemblies 130 is disposed on the fourth side 116 adjacent to the first side 113. The group of identification assemblies 130 disposed on the first side 113 of the cleaning device body 110 is configured to identify a region topography of the target region 100 located in front of the cleaning device body 110, for example, a wall topography of a target side wall 1011 opposite to the first side 113 and/or a distance between the first side 113 and the corresponding target side wall 1011. The other group of identification assemblies 130 disposed on the fourth side 116 of the cleaning device body 110 is configured to identify a region topography of the target region 100 on a side of the cleaning device body 110, for example, a wall topography of a target side wall 1011 opposite to the fourth side 116 and/or a distance between the fourth side 116 and the corresponding target side wall 1011. The two groups of identification assemblies 130 are disposed, so that identification sensitivity is improved, and a misjudgment probability is reduced. In addition, identification efficiency is improved. In this way, the following case can be avoided: The operation posture of the cleaning device 1000 cannot be adjusted, causing the cleaning device 1000 to slip at the edge of the target side wall 1011, climb in the height direction of the target side wall 1011, or directly hit the target side wall 1011.

In some embodiments, the cleaning device 1000 includes two groups of identification assemblies 130. One group of identification assemblies 130 is disposed on the first side 113 of the cleaning device body 110. The other group of identification assemblies 130 is disposed on the third side 115 adjacent to the first side 113. In other embodiments, the cleaning device 1000 includes three groups of identification assemblies 130. The three groups of identification assemblies 130 are respectively disposed on the first side 113, the third side 115, and the fourth side 116 of the cleaning device body 110.

In some embodiments, the first identification sub-part 131 is an infrared sensor, and the second identification sub-part 132 is an ultrasonic sensor. The ultrasonic sensor has a large detection range and can detect an obstacle far away from the cleaning device 1000. The infrared sensor has a small detection range and can only detect an obstacle close to the cleaning device 1000. In actual use, the ultrasonic sensor is used as a primary detection component, and the infrared sensor is used as an auxiliary detection component. However, when the cleaning device 1000 is close to the obstacle, and the obstacle is in a special shape, a detection effect of the infrared sensor is better than that of the ultrasonic sensor. For example, when a boundary of the target side wall 1011 is arc-shaped, and a slope of the wall is large, the ultrasonic sensor may not receive a returned signal and obtain distance data after sending a detection signal to the wall. Consequently, the ultrasonic sensor may misidentify the boundary as an operational region, causing the cleaning device 1000 to climb in the height direction of the target side wall 1011 or directly hit the target side wall 1011. The infrared sensor can be disposed to more accurately detect the target side wall 1011 close to the cleaning device 1000. In this way, the infrared sensor and the ultrasonic sensor can jointly detect the region topography of the target region 100. For example, when the cleaning device 1000 needs to identify the boundary of the target side wall 1011, if both the ultrasonic sensor and the infrared sensor can obtain distance data, the boundary of the target side wall 1011 of the target region 100 is straight line-shaped, or if the ultrasonic sensor cannot obtain distance data, and the infrared sensor can obtain the distance data, the boundary of the target side wall 1011 of the target region 100 is arc-shaped.

In an embodiment, the first identification sub-part 131 and the second identification sub-part 132 may be both ultrasonic sensors or infrared sensors.

In some embodiments, the boundary of the target side wall 1011 is identified by the identification assembly 130, so that the cleaning device 1000 can move along the target side wall 1011, and when the cleaning device 1000 moves along the edge, the identification assembly 130 can record a motion trajectory, a moving distance, and a change in the wall topography of the target side wall 1011 existing when the cleaning device 1000 moves around the target side wall 1011 by one circle, and a map of the target region 100 can be generated based on the motion trajectory, the moving distance, and the change in the wall topography of the target side wall 1011 existing when the cleaning device 1000 moves around the target side wall 1011 by one circle. The identification assembly 130 is disposed, so that construction of the map can be completed after the cleaning device 1000 moves around the target side wall 1011 by one circle, which reduces time costs and is efficient. This effectively improves map construction efficiency.

In some embodiments, after the identification assembly 130 identifies the region topography, the operation posture of the cleaning device 1000 may be further adjusted via an inertial measurement unit (Inertial Measurement Unit, IMU).

In an embodiment, the cleaning device 1000 further includes a vision sensing assembly 140. The vision sensing assembly 140 is configured to collect an image of the target region 100, and the collected image is processed by a control assembly, to control an action or a behavior of the cleaning device 1000. For example, the vision sensing assembly 140 is configured to shoot an environment of the target region 100 and identify an image feature, so that functions such as localization, target identification, map construction, obstacle avoidance, and the like are implemented based on the image feature. For example, a previous frame of captured image is compared with a next frame of captured image to correct a positioning error due to slipping or overturning of the cleaning device 1000, an accumulated error of the inertial measurement unit of the cleaning device 1000, or the like. In addition, pictures are continuously captured during operation of the cleaning device 1000. If the cleaning device 1000 determines that construction of the map is completed, and a same picture matches a history picture, the cleaning device 1000 may perform repositioning in a case where the cleaning device 1000 is lost. Furthermore, a specific target may be identified, and whether the specific target is trash that needs to be sucked in or an obstacle that needs to be avoided is determined. The vision sensing assembly 140 and/or the identification assembly 130 may be configured to plan a motion path of the cleaning device 1000, so that the cleaning device 1000 can regularly clean the target region 100 and construct a map. This can improve cleaning efficiency and a cleaning effect of the cleaning device 1000.

Figure 6:
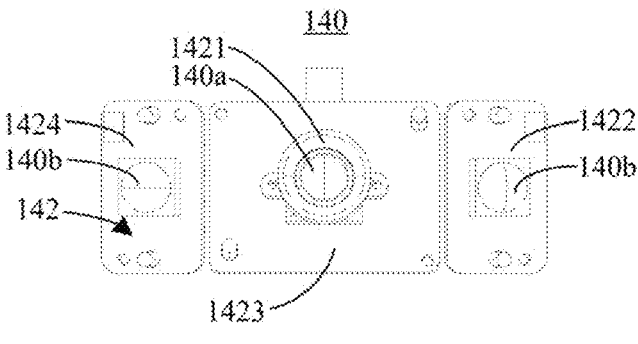
FIG. 6 is a schematic structural view of mating between a camera unit, a light supplement part, and a mounting plate of a vision sensing assembly of a cleaning device according to the present disclosure.
Figure 7:
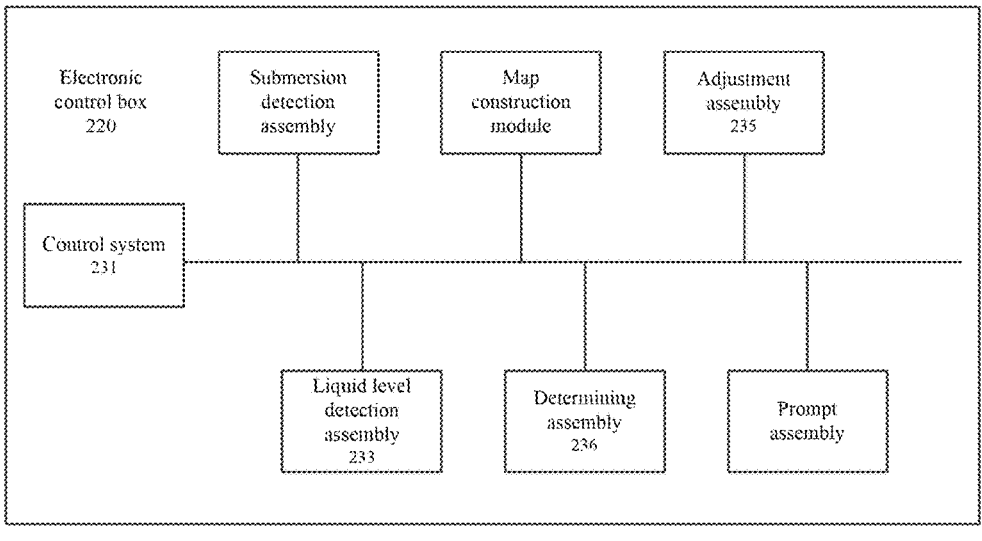
FIG. 7 is a schematic structural view of mating between a control system and a part of a structure of an electronic control box of a cleaning device according to the present disclosure.

Refer to FIG. 6. FIG. 6 is a schematic structural view of mating between a camera unit, a light supplement part, and a mounting plate of a vision sensing assembly of a cleaning device according to the present disclosure. The vision sensing assembly 140 includes a camera unit 140*a* and several light supplement parts 140*b*. The camera unit 140*a* is configured to shoot an image of the target region 100. The light supplement part 140*b* is configured to adjust brightness of a region captured by the camera unit 140*a*.

The camera unit 140*a* and the light supplement part 140*b* may be disposed on any side surface of the cleaning device body 110. For example, the vision sensing assembly 140 may face a forward direction of the cleaning device 1000, that is, the vision sensing assembly 140 may be disposed on the first side 113. The camera unit 140*a* and the light supplement part 140*b* may be located on a side of the cleaning device body 110, and the side of the cleaning device body 110 is provided with the debris inlet 1111. When the camera unit 140*a* detects, through target identification, that there is trash within a field of view of the camera unit 140*a*, the cleaning device 1000 may directionally move to a trash region and perform spot cleaning on the region. This improves the cleaning effect of the cleaning device 1000. In some embodiments, when the camera unit 140*a* detects that there is the trash within the field of view of the camera unit 140*a*, the vision sensing assembly 140 can position the trash and plan a motion path based on a position at which the trash is located, and the cleaning device 1000 moves along the planned path, enabling a first debris inlet 1111*a* to be close to the trash. When the first debris inlet 1111*a* is close to the trash, a blocking door 119 at the first debris inlet 1111*a* is opened to allow the trash to be sucked into the filtering box 120. In this case, a cleaning mechanism does not need to be started to maximally save power. In addition, the cleaning device 1000 moves along the planned path, so that the trash can be prevented from entering a dead/blind zone of the camera unit 140*a*.

With reference to FIG. 1 to FIG. 5, the cleaning device 1000 further includes a first auxiliary cleaning assembly 150 and a second auxiliary cleaning assembly 160. The first auxiliary cleaning assembly 150 is disposed at an edge of the debris inlet 1111 and configured to guide at least a part of trash in the target region 100 to a working region of the debris inlet 1111 or scrub the target side wall 1011 of the target region 100. The second auxiliary cleaning assembly 160 is configured to spray water to a to-be-cleaned region of the target region 100 to guide at least a part of trash to the working region of the debris inlet 1111 or flush the target side wall 1011 or the target bottom wall 1012 of the target region 100. A projection of the first auxiliary cleaning assembly 150 on the travel surface 101 is at least partially beyond a projection of an outer contour of a track 193 on the travel surface 101.

The cleaning device 1000 further includes a propulsion assembly 180 and a traveling mechanism 190. The propulsion assembly 180 is configured to drive the cleaning device 1000 to move on the water surface or in water of the target region 100. The traveling mechanism 190 is configured to drive the cleaning device 1000 to move on the travel surface 101 of the target region 100.

In some embodiments, the cleaning device 1000 further includes an adjustment assembly 235. The adjustment assembly 235 is connected to the control system 231. The control system 231 can determine, based on a brightness degree of an image captured by the camera unit 140*a*, a brightness degree of an environment in which the camera unit 140*a* is currently located, and control, based on the brightness degree of the environment in which the cleaning device 1000 is currently located, the adjustment assembly 235 to adjust light supplement brightness of the light supplement part 140*b*. Adjustment of the adjustment assembly 235 for the light supplement part 140b may include turning on the light supplement part 140b, turning off the light supplement part 140b, increasing the brightness of the light supplement part 140b, and decreasing the brightness of the light supplement part 140b. For example, when the camera unit 140a is in a dim light or backlight environment, the brightness of the light supplement part 140b is increased by using the adjustment assembly 235 based on a brightness degree of the light or a backlight degree to improve definition of the image captured by the camera unit 140a. When the camera unit 140a is in a bright light environment, the light supplement part 140b is turned off, or the brightness of the light supplement part 140b is decreased by using the adjustment assembly 235 to reduce power consumption of the cleaning device 1000 without affecting the definition of the image captured by the camera unit 140a. In some embodiments, the control system 231 can control, based on an exposure degree of the image captured by the camera unit 140a, the adjustment assembly 235 to adjust an exposure parameter of the camera unit 140a to improve image quality of the camera unit 140a.

In some embodiments, the control system 231 can control, based on a current state and/or detection data of the cleaning device 1000, the adjustment assembly 235 to continuously turn off the light supplement part 140b or decrease the brightness of the light supplement part 140b. The current state of the cleaning device 1000 may include a posture of the cleaning device 1000. The detection data of the cleaning device 1000 may include the brightness degree of the environment, detected by the cleaning device 1000, in which the camera unit 140a is currently located. However, this is not limited thereto.

When the current state and/or the detection data of the cleaning device 1000 meet a preset condition, the light supplement part 140b is continuously turned off or the light supplement brightness of the light supplement part 140b remains within a fixed range until a condition for turning on the light supplement part 140b or increasing the brightness of the light supplement part 140b is met. For example, when the brightness degree meets a preset threshold within preset time, the cleaning device 1000 may be in a scenario in which the cleaning device 1000 is about to be in contact with the target side wall 1011. In this case, the light supplement part 140b is continuously turned off, or the brightness of the light supplement part 140b is decreased. When the cleaning device 1000 is almost perpendicular to a horizontal plane, and the first side 113 faces upward, the cleaning device 1000 may be in a scenario in which the cleaning device 1000 is about to climb from the target bottom wall 1012 to the target side wall 1011 or a platform. In this case, the light supplement part 140b is continuously turned off, or the brightness of the light supplement part 140b is decreased. In this way, the following case can be avoided: The brightness is frequently adjusted by using the light supplement part 140b due to misjudgment of a frequent change in the brightness degree of the environment in which the camera unit 140a is currently located, causing consumption of the light supplement part 140b to be increased and user experience to be affected. This improves operation effectiveness of the light supplement part 140b.

In some embodiments, the cleaning device 1000 further includes a determining assembly 236. The determining assembly 236 has an identification function and a determining function. The determining assembly 236 is connected to the camera unit 140a. The determining assembly 236 can determine a specific target in the target region 100 based on a captured image in a manner such as machine learning, so that the cleaning device 1000 can perform obstacle avoidance or move to the specific target to perform cleaning. For example, in a case where the determining assembly 236 determines a fixed facility such as a ladder or identifies an obstacle such as a rock, the cleaning device 1000 performs obstacle avoidance, and in a case where the determining assembly 236 determines trash such as a leaf or a cleanable region such as a platform, the cleaning device 1000 moves to the trash or the cleanable region to perform cleaning. The determining assembly 236 can further identify a structure of the target based on the captured image, so that the cleaning device 1000 can complete cleaning of one region before cleaning another region. This avoids a case where the cleaning device 1000 moves to another region before completing cleaning of the region in which the cleaning device 1000 is located.

In some embodiments, the determining assembly 236 can further track trash. This avoids a case where the trash enters the dead zone of the camera unit 140a, causing the trash to fail to be cleaned.

In some embodiments, the vision sensing assembly 140 and/or the determining assembly 236 are/is enabled in a specific cleaning mode. The specific cleaning mode may be executed independently after being enabled or may be executed after a conventional cleaning mode ends. This is not limited herein. A conventional cleaning mode is a mode in which the vision sensing assembly 140 and/or the determining assembly 236 are/is not enabled. Specifically, the specific cleaning mode is a mode in which the cleaning device 1000 cruises and performs cleaning in the target region 100 along a preset cleaning path, for example, a bow-shaped path (the bow-shaped path means that two adjacent paths are parallel to each other, and the swimming pool robot moves along the two adjacent paths in two opposite forward directions) or a square spiral path. If in a process of cruising and performing cleaning, it is determined that there is a specific target in the target region 100, for example, a leaf, the cleaning device moves to the specific target to perform cleaning and after completing cleaning, the cleaning device 1000 may move backward to return to an original cleaning path and continue to cruise along the preset cleaning path. Whether cleaning of the specific target is completed may be determined in a plurality of manners. For example, the determining assembly 236 may directly identify whether the target has been cleaned, or a determining condition may be preset, and if the condition is met, it is considered that cleaning is completed. For example, the determining condition is a time condition, and if the cleaning device 1000 stays at the specific target for preset time, it is considered that cleaning is completed. Specific content of the determining condition is not limited herein.

In some embodiments, in the specific cleaning mode, a spacing between adjacent sub-paths of the preset cleaning path may be dynamically adjusted. For example, if the determining assembly 236 does not identify trash on a consecutive preset quantity of adjacent sub-paths, the cleaning device 1000 is controlled to expand the spacing between adjacent to-be-cruised sub-paths. For example, the spacing is adjusted from a first path spacing to a second path spacing, and the second path spacing is greater than the first path spacing. If the determining assembly 236 identifies the trash on the consecutive preset quantity of adjacent sub-paths or identifies a plurality of pieces of trash on a single sub-path, the cleaning device 1000 is controlled to adjust the spacing between the adjacent to-be-cruised sub-paths from the second path spacing to the first path spacing or any spacing less than the second path spacing. In this way, cleaning effectiveness can be improved, and the cleaning efficiency can also be improved.

In some embodiments, when the cleaning device is in the specific cleaning mode, a stop condition is included. The stop condition may be completion of cruising of the target region 100 or end time of cleaning estimated based on an area of the target region 100. The area of the target region 100 may be estimated after the map construction module 234 constructs a map of the target region 100.

In some embodiments, when the cleaning device is in the specific cleaning mode, a platform cleaning function is further performed. A platform may be a surface in the target region 100, and the surface is higher than the target bottom wall 1012 and has a step.

Figure 8:
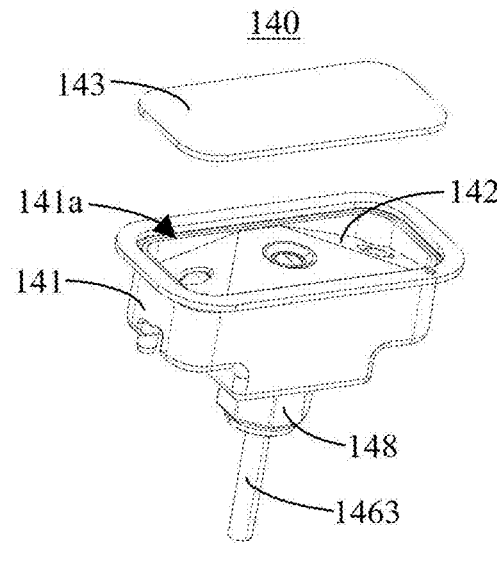
FIG. 8 is a schematic view of an exploded structure of a vision sensing assembly of a cleaning device according to an embodiment of the present disclosure.

Refer to FIG. 1 and FIG. 8. FIG. 8 is a schematic view of an exploded structure of a vision sensing assembly of a cleaning device according to an embodiment of the present disclosure. The cleaning device body 110 includes a second accommodating cavity 112. The vision sensing assembly 140 is disposed in the second accommodating cavity 112. The second accommodating cavity 112 has a first opening 112a. The first opening 112a may be disposed on any side of the cleaning device body 110. For example, the first opening 112a may be disposed on the first side 113 of the cleaning device body 110. The vision sensing assembly 140 further includes an accommodating cabin 141 and a mounting plate 142 and a light transmission part 143 that are disposed in the accommodating cabin 141. The accommodating cabin 141 is a basic carrier of the vision sensing assembly 140, provides accommodating space and fixed positions for the mounting plate 142, the light transmission part 143, the camera unit 140a, and the light supplement part 140b, and other components of the vision sensing assembly 140, and protects the mounting plate 142, the light transmission part 143, the camera unit 140a, and the light supplement part 140b, and other components of the vision sensing assembly 140 from water, vibration, and the like.

The accommodating cabin 141 is fixed in the second accommodating cavity 112. A fixing manner includes screw fixing, rivet fixing, bolt fixing, pin-key fixing, welding fixing, adhesive bonding fixing, snap-fit fixing, magnetic adsorption fixing, and the like. However, this is not limited thereto.

The mounting plate 142 is disposed at an end of the accommodating cabin 141, the end of the accommodating cabin 141 is provided with a cabin opening 141a, and the mounting plate 142 is located in the accommodating cabin 141. The camera unit 140a and the light supplement part 140b are mounted on the mounting plate 142. The mounting plate 142 may be integrally molded on the accommodating cabin 141 to ensure structural strength of the mounting plate 142 and sealing performance between the mounting plate 142 and the accommodating cabin 141. Certainly, the mounting plate 142 may alternatively be fixedly connected to the accommodating cabin 141.

The vision sensing assembly 140 may include a plurality of light supplement parts 140b. The plurality of light supplement parts 140b are disposed around the camera unit 140a. In embodiments of the present disclosure, an example in which the vision sensing assembly 140 includes two light supplement parts 140b is used for description. One light supplement part 140b is disposed on one side of the camera unit 140a, and the other light supplement part 140b is disposed on another side of the camera unit 140a. In some embodiments, an optical axis of the camera unit 140a is lower than a center of the light supplement part 140b. For example, the camera unit 140a is closer to the fifth side 117 of the cleaning device 1000 than the light supplement part 140b, to avoid the following case: Light radiates from the light supplement part 140b to the camera unit 140a, leading to overexposure of an image captured by the camera unit 140a.

In some embodiments, a connection line between a center of the camera unit 140a and centers of the two light supplement parts 140b may be parallel to an arrangement direction of the third side 115 and the fourth side 116 of the cleaning device 1000.

In some embodiments, as shown in FIG. 6, a side of the mounting plate 142 faces the cabin opening 141a, and the side has a first surface 1422, a second surface 1423, and a third surface 1424 that are sequentially connected. A side of each of the first surface 1422 and the second surface 1423 is away from the cabin opening 141a, an included angle is formed between the sides, and the included angle is obtuse. A side of each of the second surface 1423 and the third surface 1424 is away from the cabin opening 141a, an included angle is also formed between the sides, and the included angle is obtuse. The camera unit 140a is located on the second surface 1423. One light supplement part 140b is located on the first surface 1422. The other light supplement part 140b is located on the third surface 1424. Irradiation regions of the light supplement parts 140b on two sides of the camera unit 140a deviate from the field of view of the camera unit 140a. In this way, when the field of view of the camera unit 140a tilts downward, the following case can be avoided: Light in the field of view of the camera unit 140a is too strong, leading to overexposure of an image captured by the camera unit 140a.

In some embodiments, the vision sensing assembly 140 further includes a light shielding part 1421. The light shielding part 1421 is mounted on the mounting plate 142. The light shielding part 1421 is disposed at a periphery of the camera unit 140a or an edge of a side of the camera unit 140a, where the side of the camera unit 140a is close to the light supplement part 140b.

The light transmission part 143 covers the cabin opening 141a of the accommodating cabin 141. The light transmission part 143 is located on a side of the mounting plate 142, and the side of the mounting plate 142 is close to the cabin opening 141a of the accommodating cabin 141. The camera unit 140a can shoot the target region 100 through the light transmission part 143. The light from the light supplement part 140b can pass through the light transmission part 143.

To ensure the imaging quality of the camera unit 140a, a service life of the camera unit 140a, and the service life of the light supplement part 140b, specific sealing performance between the light transmission part 143 and the accommodating cabin 141 needs to be ensured, to prevent liquid from entering a gap between a light transmission lens and the mounting plate 142 or prevent moisture from adhering to the side of the light transmission part 143, where the side of the light transmission part 143 faces the mounting plate 142.

In some embodiments, the accommodating cabin 141 and the light transmission part 143 are sealed by using sealant. The accommodating cabin 141 and the light transmission part 143 are sealed by using the sealant, so that the liquid in the target region 100 cannot infiltrate into the gap between the light transmission part 143 and the mounting plate 142 from a gap between the accommodating cabin 141 and the light transmission part 143.

The backplane 147 is provided with an aperture 147a communicating with the inside of the accommodating cabin 141. The aperture 147a is configured to allow a wire harness 1463 to be inserted. A sleeve seat 148 is disposed at an edge of the aperture 147a. The sleeve seat 148 is configured to seal the aperture 147a and the wire harness 1463.

Figure 9:
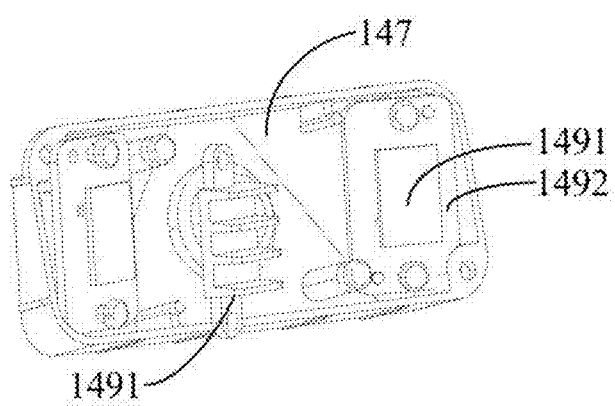
FIG. 9 is a schematic structural view of a heat sink of a vision sensing assembly of a cleaning device according to an embodiment of the present disclosure.

In some embodiments, refer to FIG. 9. FIG. 9 is a schematic structural view of a heat sink of a vision sensing assembly of a cleaning device according to an embodiment of the present disclosure. The vision sensing assembly 140 further includes a heat dissipation part 1491. The heat dissipation part 1491 is disposed on an inner wall of the accommodating cabin 141, a side of the backplane 147, where the side faces the mounting plate 142, and/or a side of the mounting plate 142, where the side faces the backplane 147. The heat dissipation part 1491 is thermally conductively connected to the inner wall of the accommodating cabin 141, the backplane 147, and/or the mounting plate 142. The heat dissipation part 1491 can absorb heat generated by a heat dissipation component inside the accommodating cabin 141 and transfer the heat to the inner wall of the accommodating cabin 141, so that the heat is released to the external environment through the inner wall of the accommodating cabin 141.

In some embodiments, the vision sensing assembly 140 further includes a thermally conductive material 1492. The thermally conductive material 1492 is disposed between the inner wall of the accommodating cabin 141 and the heat dissipation part 1491, between the backplane 147 and the heat dissipation part 1491, and/or between the mounting plate 142 and the heat dissipation part 1491. The thermally conductive material 1492 may be a product with high thermal conductivity, for example, thermally conductive silica gel, thermally conductive silicone grease, or a soft silica gel thermal pad.

In some embodiments, with reference to FIG. 1, there may be one or more debris inlets 1111, which may be disposed at the bottom of the cleaning device 1000 or may be disposed at a front side, a top, or the like of the cleaning device 1000. For example, the debris inlets 1111 include the first debris inlet 1111a disposed at the first side 113 of the cleaning device 1000 and/or the second debris inlet 1111b disposed at the fifth side 117 of the cleaning device 1000. Specifically, the first debris inlet 1111a may be disposed at a position on the first side 113 of the cleaning device body 110, and the position is close to the sixth side 118. The second debris inlet 1111b may be disposed at a position on the fifth side 117 of the cleaning device body 110, and the position is close to the first side 113. However, this is not limited thereto.

In some embodiments, the first auxiliary cleaning assembly 150 is disposed close to the first debris inlet 1111a and/or the second debris inlet 1111b, for example, at an edge of the first debris inlet 1111a. At least a part of the first auxiliary cleaning assembly 150 is located in front of the debris inlet 1111 to guide at least a part of trash outside the working region of the debris inlet 1111 to the working region of the debris inlet 1111. The cleaning device 1000 may include two first auxiliary cleaning assemblies 150. The two first auxiliary cleaning assemblies 150 are disposed opposite to each other on two sides of the debris inlet 1111, for example, on two sides of the first debris inlet 1111a or two sides of the second debris inlet 1111b. The first auxiliary cleaning assemblies 150 can rotate toward the debris inlet 1111 to guide the trash to the working region of the debris inlet 1111. Certainly, the first auxiliary cleaning assembly 150 may alternatively be disposed at another position, provided that it can be ensured that the first auxiliary cleaning assembly 150 can guide the trash to the working region of the debris inlet 1111.

In some embodiments, in the moving direction of the cleaning device 1000, at least a part of the first auxiliary cleaning assembly 150 is located in front of the first debris inlet 1111a to guide a water flow outside the working region of the first debris inlet 1111a to the working region of the first debris inlet 1111a.

In embodiments of the present disclosure, an example in which the first auxiliary cleaning assembly 150 guides trash floating on the water surface of the target region 100 to the working region of the first debris inlet 1111a when the cleaning device 1000 moves on the water surface of the target region 100 is used for description. When the cleaning device 1000 moves on the water surface of the target region 100, at least a part of the first auxiliary cleaning assembly 150 is exposed above the water surface, that is, the first auxiliary cleaning assembly 150 is fully exposed above the water surface and there is a preset distance between the first auxiliary cleaning assembly 150 and a horizontal plane; or the first auxiliary cleaning assembly 150 is fully exposed at the water surface and the first auxiliary cleaning assembly 150 faces and is in contact with the water surface, or one part of the first auxiliary cleaning assembly 150 submerges in liquid and another part of the first auxiliary cleaning assembly 150 is exposed at the water surface. When the cleaning device 1000 cleans the water surface of the target region 100 by using the first auxiliary cleaning assembly 150, the blocking door 119 is opened to expose the first debris inlet 1111a, and the first auxiliary cleaning assembly 150 rotates to push the trash floating on the water surface of the target region 100 toward the working region of the first debris inlet 1111a, so that the trash is sucked in through the first debris inlet 111a.

Figure 10:
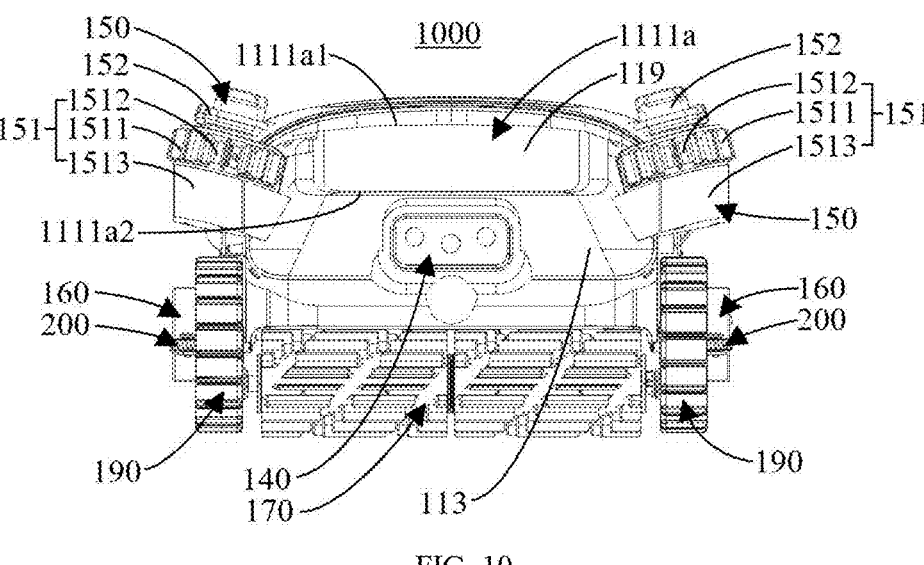
FIG. 10 is a main view of a cleaning device according to an embodiment of the present disclosure.

With reference to FIG. 1, FIG. 5, and FIG. 10, the cleaning device 1000 may include two first auxiliary cleaning assemblies 150, one of which is disposed at the joint between the first side 113 and the third side 115, and the other one of which is disposed at the joint between the first side 113 and the fourth side 116, so that the first auxiliary cleaning assemblies 150 can push trash on the first side 113, the third side 115, and the fourth side 116 of the cleaning device 1000 toward the working region of the debris inlet 1111. This expands the cleaning range of the first auxiliary cleaning assembly 150. In addition, the first auxiliary cleaning assembly 150 may be further configured to perform auxiliary cleaning, for example, clean the target side wall 1011 when the cleaning device 1000 moves close to the target side wall 1011. This improves the cleaning efficiency and the cleaning effect of the cleaning device 1000.

The first auxiliary cleaning assembly 150 can guide the trash originally located outside a coverage region of the first debris inlet 1111a to the working region of the first debris inlet 1111a, which is equivalent to expanding a cleaning range of the first debris inlet 1111a. This improves trash cleaning efficiency.

The first auxiliary cleaning assembly 150 agitates the water flow toward the first debris inlet 1111a, or a suction force of the first debris inlet 1111a is improved, to expand the cleaning range of the first debris inlet 1111a by using the first auxiliary cleaning assembly 150. This is not limited herein. In a specific embodiment, the first auxiliary cleaning assembly 150 may be rotatably disposed at the cleaning device body 110 to agitate a water flow near the first debris inlet 1111a, so that the water flow outside the working region of the first debris inlet 1111a flows to the working region of the first debris inlet 1111a. In this way, trash located outside the working region can be driven to flow to the working region of the first debris inlet 1111a with the water flow, and flow into the cleaning device body 110.

A rotation direction of the first auxiliary cleaning assembly 150 may be set based on an actual situation, provided that the water flow can be agitated to flow to the first debris inlet 1111a. For example, in the moving direction of the cleaning device 1000, in a case where it is viewed from the top of the cleaning device 1000 to the bottom of the cleaning device 1000, when the first auxiliary cleaning assembly 150 is closer to the left side of the cleaning device body 110 than the first debris inlet 1111a, the first auxiliary cleaning assembly 150 rotates in a clockwise direction, and when the first auxiliary cleaning assembly 150 is closer to the right side of the cleaning device body 110 than the first debris inlet 1111a, the first auxiliary cleaning assembly 150 rotates in a counterclockwise direction. Based on the above disposition, when the first auxiliary cleaning assembly 150 operates, the first auxiliary cleaning assembly 150 agitates a water flow away from the first debris inlet 1111a, especially a water flow located on the left front or right front of the cleaning device 1000, to the first debris inlet 1111a, and a water flow direction is substantially opposite to the moving direction of the cleaning device 1000. In other words, as the cleaning device 1000 moves, the water flow guided by the first auxiliary cleaning assembly 150 is sucked into the cleaning device body 110 through the first debris inlet 1111a.

In some embodiments, as shown in FIG. 10, the first auxiliary cleaning assembly 150 includes at least a side brush 151. The side brush 151 may be rotatably disposed on the cleaning device body 110, for example, rotatably disposed at a joint between two adjacent sides of the cleaning device body 110, and configured to guide at least a part of trash in the target region 100 to the working region of the debris inlet 1111.

At least a part of the side brush 151 is beyond a contour of the cleaning device 1000. It may be understood that when the cleaning device 1000 is located on the travel surface 101, an orthographic projection of the side brush 151 on the travel surface 101 is at least partially located outside a contour of a boundary of an orthographic projection of the cleaning device 1000 on the travel surface 101, to expand a cleaning range of the side brush 151, so that the side brush 151 can guide trash farther away from the coverage region of the first debris inlet 1111a to the working region of the first debris inlet 1111a. This improves the trash cleaning efficiency.

The side brush 151 includes a side brush body 1511, a rotation shaft 1512, and a side brush cover 1513. The side brush cover 1513 is disposed on the cleaning device body 110. The rotation shaft 1512 is rotatably disposed in the side brush cover 1513. The side brush body 1511 is disposed around the rotation shaft 1512. The side brush body 1511 is configured to agitate a water flow or be in contact with and clean wall surfaces such as the target side wall 1011 and the target bottom wall 1012. Specifically, during rotation, the rotation shaft 1512 drives the side brush body 1511 to rotate. During rotation, the side brush body 1511 can agitate a water flow or clean wall surfaces such as the target side wall 1011 and the target bottom wall 1012.

With reference to FIG. 2, the traveling mechanism 190 includes at least a first guiding wheel 191 and a second guiding wheel 192. The first guiding wheel 191 and the second guiding wheel 192 are configured to drive the cleaning device 1000 to move on the target bottom wall 1012 and the target side wall 1011. Sizes of the first guiding wheel 191 and the second guiding wheel 192 may be substantially the same. For ease of description, in the present disclosure, a plane on which the traveling mechanism 190 of the cleaning device 1000 is in contact with the to-be-cleaned surface is defined as the travel surface 101 of the cleaning device. The travel surface 101 is parallel to the forward direction of the cleaning device 1000 and substantially parallel to the to-be-cleaned surface. A plane on which a rotation shaft of the first guiding wheel 191 and a rotation shaft of the second guiding wheel 192 of the traveling mechanism 190 of the cleaning device 1000 are located is defined as a longitudinal plane of the cleaning device 1000. The longitudinal plane is parallel to the travel surface 101. A plane perpendicular to the longitudinal plane and parallel to extension directions of rotation shafts of the first guiding wheel 191 and the second guiding wheel 192 is defined as the central plane of the cleaning device 1000, and a distance between the plane and the rotation shaft of the first guiding wheel 191 is equal to a distance between the plane and the rotation shaft of the second guiding wheel 192. The central plane $\alpha$ is opposite to the first side 113 and the second side 114 of the cleaning device 1000.

When the cleaning device 1000 is in a horizontal state, the projection of the side brush 151 on the central plane $\alpha$ of the cleaning device 1000 at least partially overlaps with the projection of the first debris inlet 1111a on the central plane $\alpha$ of the cleaning device 1000 in a height direction, namely, a height direction of the cleaning device 1000. The first debris inlet 1111a includes at least a first edge 1111a1 close to the sixth side 118 of the cleaning device 1000 and a second edge 1111a2 close to the fifth side 117 of the cleaning device 1000. The above projection relationship may be further described as follows: In the height direction of the cleaning device 1000, the projection of the side brush 151 on the central plane $\alpha$ of the cleaning device 1000 is at least partially located between projections of the first edge 1111a1 and the second edge 1111a2 on the central plane $\alpha$ of the cleaning device 1000, or in the height direction of the cleaning device 1000, the side brush 151 is at least partially located between the first edge 1111a1 and the second edge 1111a2.

The height of the projection of the side brush 151 on the central plane $\alpha$ of the cleaning device 1000 is h1. The height of the projection of the first debris inlet 1111a on the central plane $\alpha$ of the cleaning device 1000 may be h2 or h3. Herein, h1 at least partially overlaps with h2 or h3. The height of the projection is a height of a projection plane.

When the cleaning device 1000 performs cleaning on the water surface, the first debris inlet 1111a is at least partially located below the water surface. In other words, the second edge 1111a2 is located below the water surface, and the first edge 1111a1 may be located above or below the water surface. The side brush 151 may alternatively be at least partially located below the water surface. An example in which the first edge 1111a1 of the first debris inlet 1111a is located above the water surface, one part of the side brush 151 is located on the water surface, and another part of the side brush 151 is located below the water surface is used. In this case, one part of the first debris inlet 1111a is located above the water surface, and another part of the first debris inlet 1111a is located below the water surface. When the side brush 151 is in operation, trash near the cleaning device 1000 may be guided to a region between the first edge 1111a1 and the second edge 1111a2, and may be directly sucked in through the first debris inlet 1111a.

In the moving direction of the cleaning device 1000, at least a part of the side brush 151 is located in front of the first debris inlet 1111a. As the cleaning device body 110 moves forward, trash cleaned and driven by the side brush 151 may naturally reach the working region of the first debris inlet 1111a.

Figures 11, 12:
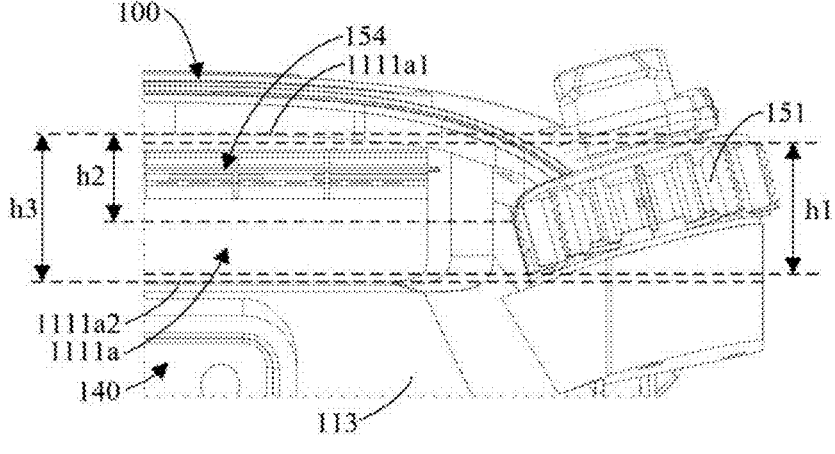
FIG. 11 is a partial schematic view of a cleaning device according to an embodiment of the present disclosure.
FIG. 12 is a bottom view of a cleaning device according to another embodiment of the present disclosure.

In an embodiment, as shown in FIG. 11, the cleaning device 1000 further includes a guiding part 154. The guiding part 154 may be rotatably disposed at the cleaning device body 110 or an opening of the filtering box 120 (namely, a debris inlet of the filtering box for water surface cleaning). As the guiding part 154 rotates, a water flow outside the filtering box 120 is guided to flow through the opening of the filtering box 120 and enter the filtering box 120. When the cleaning device 1000 is in a water surface cleaning state, the guiding part 154 is at least partially located below the water surface to effectively agitate the water flow at the opening of the filtering box 120. This improves efficiency of external debris entering the filtering box 120. In a specific embodiment, when water surface cleaning is performed, one part of the guiding part 154 is located below the water surface, and another part of the guiding part 154 is located above the water surface, which corresponds to a case where one part of the first debris inlet 1111*a* is located above the water surface, and another part of the first debris inlet 1111*a* is located below the water surface, to implement a better water surface cleaning effect.

In some embodiments, as shown in FIG. 2 and FIG. 3, the second auxiliary cleaning assembly 160 includes at least a water spray part 161 and a second drive part 162.

In some embodiments, as shown in FIG. 2, the second drive part 162 may include a first impeller 1621 and a first drive motor 1622. The first drive motor 1622 is connected to the first impeller 1621. The first drive motor 1622 is configured to drive the first impeller 1621 to rotate, to drive the liquid in the target region 100 to flow from another end of the water spray part 161 and to be sprayed out through the spout 1611. Power of the first drive motor 1622 is positively correlated with pressure of the water flow sprayed out through the spout 1611.

In some embodiments, as shown in FIG. 1, the cleaning device 1000 further includes a third auxiliary cleaning assembly 170. The third auxiliary cleaning assembly 170 may be a roller brush assembly 171. The cleaning device 1000 may include one or more roller brush assemblies 171. The roller brush assembly 171 may be disposed at the bottom of the cleaning device body 110. The roller brush assembly 171 is configured to clean the target bottom wall 1012 and the target side wall 1011. When the cleaning device 1000 moves on the target bottom wall 1012 and the target side wall 1011, the roller brush assembly 171 can scrub the target bottom wall 1012 and the target side wall 1011 to scrub off trash adhering to the target bottom wall 1012 and the target side wall 1011, so that the trash can be sucked in through the second debris inlet 1111*b* disposed at the fifth side 117 of the cleaning device 1000. This improves the cleaning effect.

In some embodiments, as shown in FIG. 2, the second auxiliary cleaning assembly 160 may be disposed on a side of the traveling mechanism 190, and the side is away from the cleaning device body 110, so that a flow path of the liquid sprayed out through the spout 1611 is not blocked by the cleaning device body 110.

In some embodiments, the traveling mechanism 190 includes the first guiding wheel 191, the second guiding wheel 192, and the track 193. The first guiding wheel 191 is spaced from the second guiding wheel 192. The track 193 is sleeved on the first guiding wheel 191 and the second guiding wheel 192. In some embodiments, the traveling mechanism 190 further includes a fourth drive part 194. The fourth drive part 194 may be a motor, an electric pump, or the like. However, this is not limited thereto. The fourth drive part 194 may be connected to the first guiding wheel 191 and/or the second guiding wheel 192.

In some embodiments, the cleaning device 1000 includes two roller brush assemblies 171.

In some embodiments, refer to FIG. 12. FIG. 12 is a bottom view of a cleaning device according to another embodiment of the present disclosure. The cleaning device 1000 further includes at least one topography detection assembly 196. The at least one topography detection assembly 196 is disposed at the bottom of the front portion of the cleaning device 1000 and close to the traveling mechanism 190 of the cleaning device 1000. The topography detection assembly 196 is configured to detect a topography of a to-be-cleaned surface under the cleaning device 1000 to adjust the operation posture of the cleaning device 1000. For example, the topography detection assembly 196 can detect whether a topography in the moving direction of the cleaning device 1000 is a recessed region lower than the current travel surface 101, for example, an overhanging region, so that when the topography detection assembly 196 detects that the cleaning device 1000 is about to enter the overhanging region, the cleaning device 1000 can perform steering or turn around, to avoid the following case: The cleaning device 1000 steps into the overhanging region, causing the cleaning device 1000 to flip or be damaged, thereby protecting the cleaning device 1000, or so that when the topography detection assembly 196 detects that the cleaning device 1000 is about to enter the overhanging region, the cleaning device 1000 can flip to reach another travel surface 101. In this way, travel requirements in some scenarios can be met. This improves movement flexibility of the cleaning device 1000.

The cleaning device 1000 may include one or more topography detection assemblies 196. The topography detection assembly 196 may be disposed at the bottom of the cleaning device body 110. For example, the topography detection assembly 196 may be disposed in a region at the bottom of the cleaning device body 110, where the region is close to the second side 114, or a region at the bottom of the cleaning device body 110, where the region is close to the first side 113. The topography detection assembly 196 may alternatively be disposed on the first side 113. Optionally, the cleaning device 1000 includes two topography detection assemblies 196. The two topography detection assemblies 196 are both disposed in the region at the bottom of the cleaning device body 110, and the region is close to the first side 113. One topography detection assembly 196 is close to one traveling mechanism 190, and the other topography detection assembly 196 is close to the other traveling mechanism 190.

Figure 15:
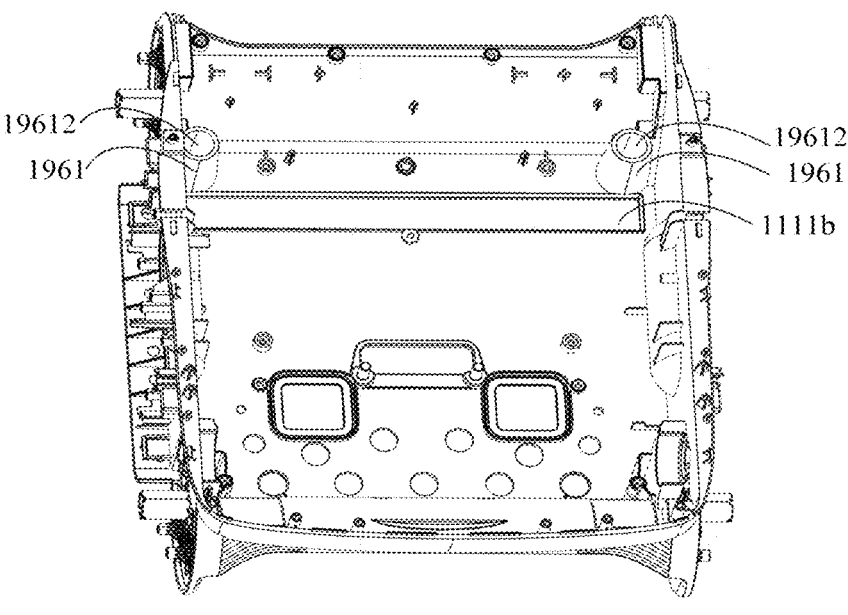
FIG. 15 is a partial schematic structural view of a bottom of a cleaning device according to an embodiment of the present disclosure.
Figure 16:
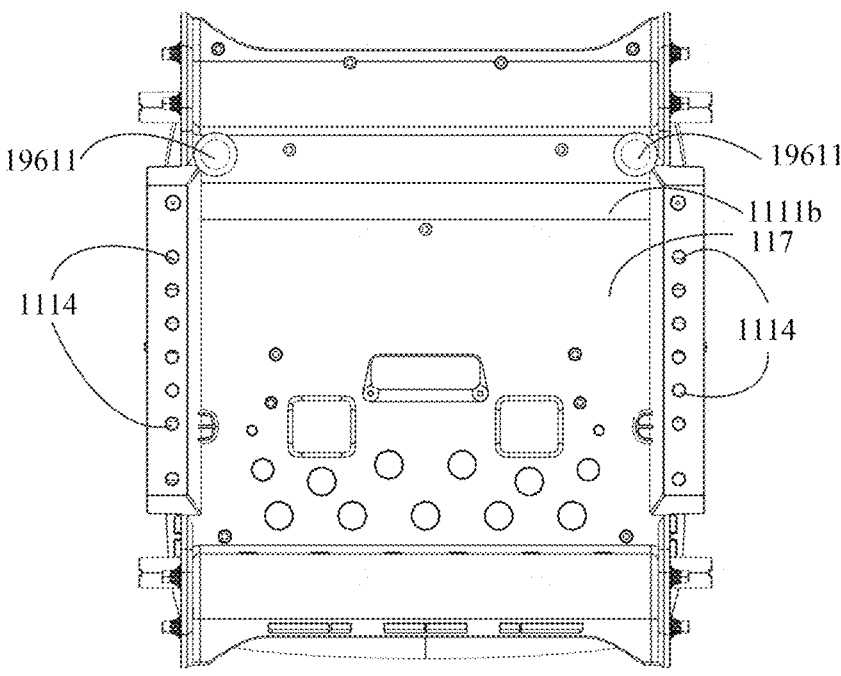
FIG. 16 is a partial schematic structural view of a bottom of a cleaning device according to another embodiment of the present disclosure.

In some embodiments, the topography detection assembly 196 faces a region under the front portion of the cleaning device 1000 and/or a region under the rear portion of the cleaning device 1000. For example, the topography detection assembly 196 is disposed at any position on the cleaning device body 110, so that a signal transceiver of the topography detection assembly 196 faces the region under the front portion and/or the region under the rear portion of the cleaning device to detect a topography of a to-be-cleaned surface under the front portion and/or the rear portion of the cleaning device 1000. As shown in FIG. 15 and FIG. 16, at least one transmission channel 1961 is disposed inside the cleaning device body 110. The transmission channel 1961 protrudes from the bottom housing of the cleaning device body 110 toward the inside of the cleaning device body 110 and is presented as being of a hollow structure. Two sides of the transmission channel 1961 are provided with a third opening 19611 and a fourth opening 19612. The third opening 19611 is located on the fifth side 117 of the cleaning device body 110. The fourth opening 19612 is located inside the cleaning device body 110. The signal transceiver of the topography detection assembly 196 is disposed close to the fourth opening 19612, so that a sent detection signal can pass through the transmission channel 1961 and be transmitted to the outside of the cleaning device body 110 through the third opening 19611. A process in which the topography detection assembly 196 receives an external signal of the cleaning device body 110 is opposite to the above process. The external signal of the cleaning device body 110 is a signal from the outside of the cleaning device body 110. For example, when the topography detection assembly 196 is an ultrasonic sensor, the detection signal sent by the topography detection assembly 196 is an ultrasonic signal, and the external signal may be a signal obtained through reflection of the ultrasonic signal.

The transmission channel 1961 may be in a shape of a truncated cone tapering in a direction from the fifth side 117 to the sixth side 118 or in a form of a cylinder. This is not limited herein. The transmission channel 1961 may be integrally molded with the bottom housing of the cleaning device body 110 or may be detachably disposed with the bottom housing of the cleaning device body 110. The transmission channel 1961 is disposed, so that the topography detection assembly 196 can be disposed inside the cleaning device body 110, to avoid the following case: The topography detection assembly 196 is disposed outside the cleaning device body 110 and may be subject to interference from an external factor such as an environment. This reduces an impact of the external factor on a detection result of the topography detection assembly 196 and therefore ensures accuracy of the detection result. The transmission channel 1961 is disposed, so that a transmission distance of the signal transmitter of the topography detection assembly 196 is increased, to avoid the following case: The signal transmission distance is too short, leading to a decrease in detection accuracy.

Figure 13:
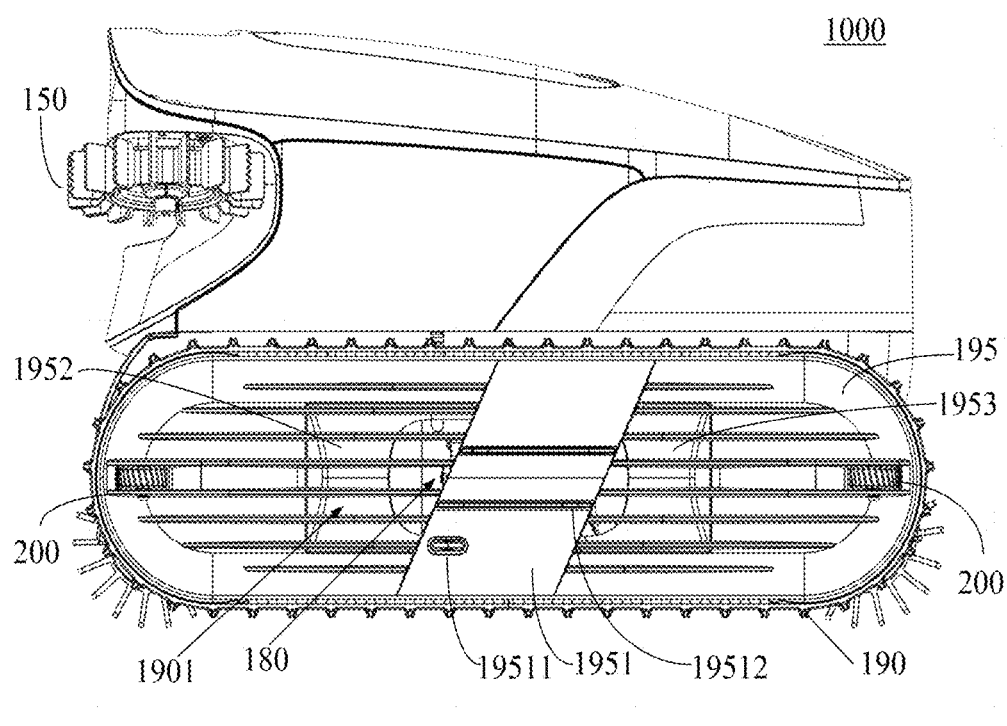
FIG. 13 is a side view of a cleaning device according to a fourth embodiment of the present disclosure.

Refer to FIG. 2, FIG. 4, and FIG. 13. FIG. 13 is a side view of a cleaning device according to a fourth embodiment of the present disclosure. The cleaning device 1000 further includes a cover plate 195. The cover plate 195 covers a side of the traveling mechanism 190, where the side is away from the cleaning device body 110, and covers at least the first guiding wheel 191 and the second guiding wheel 192, so that the first guiding wheel 191 and the second guiding wheel 192 are invisible from an outer side portion of the cleaning device 1000. If the traveling mechanism 190 includes the track 193, an area of a ring formed by the track 193 is substantially the same as an area of the cover plate. The cover plate 195 may detachably cover the side of the traveling mechanism 190, where the side is away from the cleaning device body 110, so that the cover plate 195 can be detached. This facilitates cleaning and maintenance of the first guiding wheel 191 and the second guiding wheel 192. A side surface of the cover plate 195 is away from the cleaning device body 110, and the side surface may be a complete plane or a non-complete plane, for example, a grid. This is not limited herein.

The cleaning device 1000 further includes a first anti-collision part 200. There may be one or more first anti-collision parts 200. The first anti-collision part 200 at least partially or completely protrudes from the contour of the cleaning device body 110.

In some embodiments, the cleaning device 1000 may include two propulsion assemblies 180. One propulsion assembly 180 is disposed on one side of the cleaning device body 110, and the other propulsion assembly 180 is disposed on another side of the cleaning device body 110. When the cleaning device needs to make a turn or turn around, power or a direction of each propulsion assembly 180 is adjusted, so that the cleaning device can make a turn or turn around. When the cleaning device 1000 moves in the liquid, the cleaning device 1000 may adjust the power of the propulsion assembly 180 on each of two sides of the cleaning device body 110 to adjust a speed at which the liquid is driven by the propulsion assembly 180 on each of two sides of the cleaning device body 110 to move in a preset direction, so that the cleaning device 1000 makes a turn.

Figure 21:
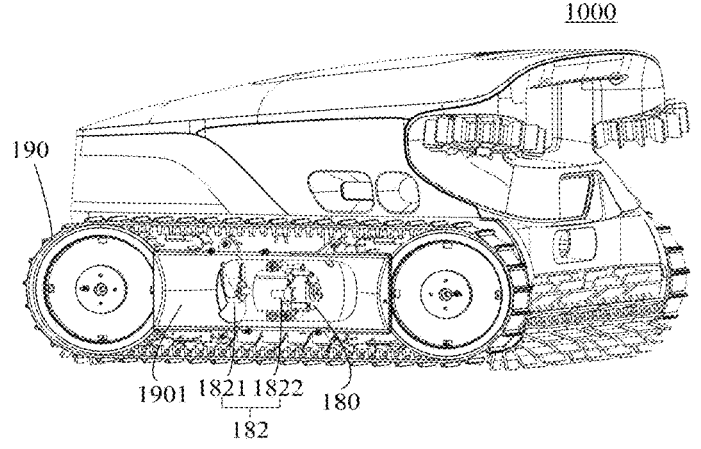
FIG. 21 is a side view of a cleaning device according to a fifth embodiment of the present disclosure.
Figure 22:
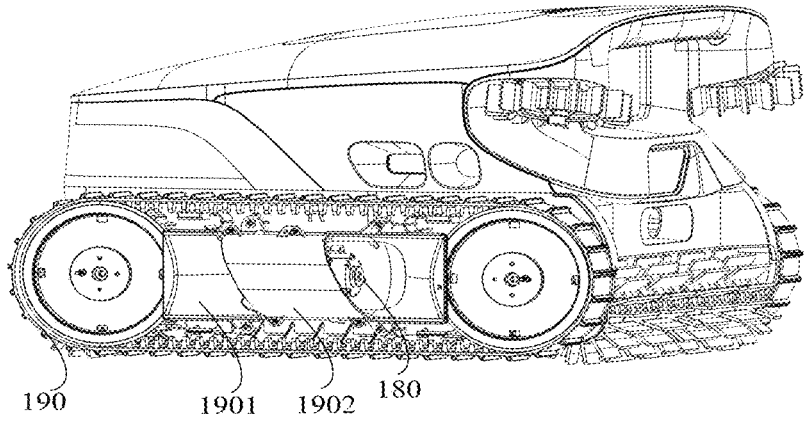
FIG. 22 is a side view of a cleaning device according to a sixth embodiment of the present disclosure.

In some embodiments, as shown in FIG. 21 and FIG. 22, the propulsion assembly 180 is disposed in internal space of the traveling mechanism 190. Specifically, the propulsion assembly 180 may be located between the first guiding wheel 191 and the second guiding wheel 192 that are on the same side. This reduces the structural complexity of the cleaning device 1000. The cover plate 195 of the traveling mechanism 190 may be partially of a hollow structure. The propulsion assembly 180 can be viewed from the outside of the cover plate 195 at a particular viewing angle. Water outside the cleaning device 1000 may enter the internal space of the traveling mechanism 190 from one side of at least a part of the hollow structure (namely, a first hollow structure 1952), flow through the propulsion assembly 180 disposed in the internal space of the traveling mechanism 190, and then flow out of the internal space of the traveling mechanism 190 from another side of at least another part of the hollow structure (namely, a second hollow structure 1953), to form a complete fluid path of the propulsion assembly 180. In this embodiment, the third drive part 182 (including the second impeller 1821 and the second drive motor 1822) of the propulsion assembly 180 may alternatively rotate in a reverse direction to form two fluid paths in opposite directions. In this case, the propulsion assembly 180 can implement both the propulsion function and the auxiliary cleaning function. Certainly, the third drive part 182 of the propulsion assembly 180 may not rotate in a reverse direction, to only play the propulsion function. When the auxiliary cleaning function is not needed, the second auxiliary cleaning assembly 160 may not be disposed.

Figure 23:
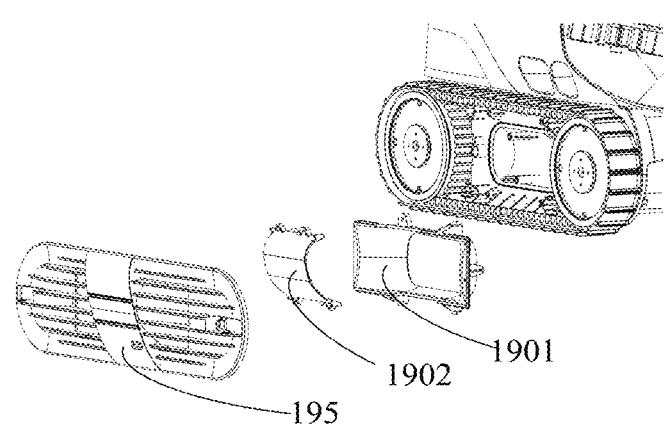
FIG. 23 is a partial side exploded view of a cleaning device according to an embodiment of the present disclosure.

In some embodiments, refer to FIG. 21 and FIG. 23. FIG. 21 is a side view of a cleaning device according to a fifth embodiment of the present disclosure. FIG. 23 is an exploded view of a part of a side surface of a cleaning device according to an embodiment of the present disclosure. For ease of description, the third drive part 182 is omitted in FIG. 23. The propulsion assembly 180 includes the third drive part 182. A base 1901 is further disposed in the internal space of the traveling mechanism 190. The base 1901 is located on a side of the propulsion assembly 180, and the side faces the cleaning device body 110. The propulsion assembly 180 may be partially or completely accommodated in space formed by the base 1901. The base 1901 may be disposed on a side plate (not shown) on a side of the traveling mechanism 190, and the side is close to the cleaning device body 110. However, this is not limited thereto. In some embodiments, refer to FIG. 22 and FIG. 23. FIG. 22 is a side view of a cleaning device according to a sixth embodiment of the present disclosure. The cleaning device 1000 is further provided with a flow channel baffle plate 1902. The flow channel baffle plate 1902 is disposed on a side of the propulsion assembly 180, and the side is away from the cleaning device body 110. The flow channel baffle plate 1902 may be fixedly or detachably connected to the base 1901 and form at least a part of a fluid flow channel of the propulsion assembly 180 together with the base 1901. The flow channel baffle plate 1902 may be disposed on a side surface of the cover plate 195, and the side surface faces the cleaning device body 110. When the cover plate 195 covers the traveling mechanism 190, the base 1901 and the flow channel baffle plate 1902 together form at least a part of the fluid flow channel of the propulsion assembly 180. When the cover plate 195 is detached, the base 1901 and the propulsion assembly 180 are accessible, and the user can clean the propulsion assembly 180. The flow channel of the propulsion assembly 180 is limited to limit a direction in which water flows through the propulsion assembly 180. This increases operation effectiveness of the propulsion assembly 180.

In some embodiments, the side surface of the cover plate 195 is away from the cleaning device body 110, and the side surface is further provided with an additional baffle plate 1951. Two ends of the additional baffle plate 1951 are both connected to the cover plate 195. For example, one end of the additional baffle plate 1951 is fixed to an upper edge of the cover plate 195, and the other end is fixed to a lower edge of the cover plate 195. The additional baffle plate 1951 and the cover plate 195 may be integrally molded or may be detachably connected. In a longitudinal direction of the cover plate 195, the additional baffle plate 1951 may cover a surface of the cover plate 195 as a whole or may be embedded in the cover plate 195. In addition, the additional baffle plate 1951 may be disposed at a position corresponding to the propulsion assembly 180 to shield and protect the propulsion assembly 180. The additional baffle plate 1951 may be of any shape, including, but not limited to, a circle, a triangle, a polygon, and the like. A structure of the additional baffle plate 1951 may be solid or partially hollow. This is not limited herein.

In some embodiments, one or more anti-collision strips 19512 are further disposed on the additional baffle plate 1951. The anti-collision strip 19512 protrudes from the additional baffle plate 1951 and may be disposed at any easily accessible position on the additional baffle plate 1951, to prevent a surface of the additional baffle plate 1951 from being scratched. In a length direction of the additional baffle plate 1951, a length of the anti-collision strip 19512 may extend across the additional baffle plate 1951, and the anti-collision strip 19512 may be made of any friction-resistant material. This is not limited herein. In one embodiment, as shown in FIG. 13, the cover plate 195 is provided with the first hollow structure and the second hollow structure. In the forward direction of the cleaning device, the first hollow structure is located in front of the second hollow structure, and the first hollow structure and the second hollow structure are arranged on two sides of the additional baffle plate. When the cleaning device moves on the water surface, the first hollow structure serves as a water inlet of the propulsion assembly, and the second hollow structure serves as a water outlet of the propulsion assembly. The motor of the propulsion assembly rotates in a forward direction, and the water sequentially passes through the first hollow structure, a cavity formed between the base 1901 and the cover plate 195, and the propulsion assembly, and is finally discharged from the cleaning device through the second hollow structure, to apply a forward thrust to the cleaning device to drive the cleaning device to move on the water surface. If the side wall needs to be flushed underwater, the motor of the propulsion assembly rotates in a reverse direction. In this case, the first hollow structure serves as the water outlet, and the second hollow structure serves as the water inlet. Liquid enters the cavity between the base and the baffle plate through the second hollow structure, flows through the propulsion assembly, is finally discharged through the first hollow structure, and is sprayed out through the spout 1611.

In an embodiment, each of the first hollow structure and the second hollow structure may be a grill, a hole, an opening, or the like. Each of the first hollow structure and the second hollow structure is a grill and can shield the propulsion assembly to some extent while water can flow through the first hollow structure and the second hollow structure.

In some embodiments, the additional baffle plate 1951 is further provided with one or more second anti-collision parts 19511 partially or completely protruding from the additional baffle plate 1951, that is, partially or completely protruding from the contour of the side portion of the cleaning device body 110, to prevent the additional baffle plate 1951 from being scratched. If the first anti-collision part 200 is disposed on the side of the cover plate 195, where the side is away from the traveling mechanism 190, a horizontal distance over which the second anti-collision part 19511 protrudes from the contour of the side portion of the cleaning device body 110 is less than or equal to a horizontal distance over which the first anti-collision part 200 protrudes from the contour of the side portion of the cleaning device body 110, to prevent the second anti-collision part 19511 from greatly protruding, so that the second anti-collision part 19511 is less likely to be centrally hit. This reduces a possibility of damage to the second anti-collision part 19511. A structure of the second anti-collision part 19511 may be similar to that of the first anti-collision part 200, and a size of the second anti-collision part 19511 may be different from that of the first anti-collision part 200. This is not limited herein. In a vertical direction, the second anti-collision part 19511 may be disposed at a position on the additional baffle plate 1951, and the position is close to the fifth side 117. In this way, when there is a boundary with a slope in the target region 100, for example, a circular-arc-shaped boundary, a possibility that the additional baffle plate 1951 is scratched is reduced.

In some embodiments, FIG. 14 is a sectional view of a cleaning device according to another embodiment of the present disclosure. The cleaning device 1000 further includes a main drive pump 210. An opening is formed on the filtering box 120. The opening may communicate with the debris inlet 1111, for example, the first debris inlet 1111a. The filtering box 120 has a filtering surface. A first liquid discharge opening 1112 is disposed on the first accommodating cavity 111. The debris inlet 1111, the filtering box 120, and the first liquid discharge opening 1112 are in fluid communication. The main drive pump 210 is configured to drive water to flow into the filtering box 120 through the debris inlet 1111, flow through the filtering surface of the filtering box 120, and then flow out of the first accommodating cavity 111 through the first liquid discharge opening 1112. The water flowing into the filtering box 120 through the debris inlet 1111 contains trash. The trash remains in the filtering box 120 after being filtered out by the filtering box 120, and the liquid flows through the filtering surface of the filtering box 120 to the first liquid discharge opening 1112 to be discharged from the first accommodating cavity 111.

A second opening 118a is disposed on the sixth side 118 of the cleaning device body 110. The second opening 118a corresponds to the filtering box opening 122.

A filtering box cover 124 is disposed on the housing. The filtering box cover 124 is flippably or movably disposed at a putting-in and taking-out opening on the housing and configured to cover the putting-in and taking-out opening or be opened to expose the putting-in and taking-out opening, so that the filtering box can be removed from the filtering box cavity 1010 or the cleaning device body.

The cleaning device 1000 includes a second liquid discharge opening 212 in fluid communication with the first liquid discharge opening 1112. The second liquid discharge opening 212 is located at the top of the cleaning device 1000, namely, on the sixth side 118 of the cleaning device body 110. The main drive pump 210 can further drive the liquid flowing into the main drive pump 210 through the first liquid discharge opening 1112 and the liquid inlet 211 to flow along the main drive pump 210 and be discharged through the second liquid discharge opening 212. The second liquid discharge opening 212 of the main drive pump 210 is provided with a grid part 213. The grid part 213 may guide liquid flowing through the grid part 213. In an embodiment, a grid of the grid part 213 may be rotatably disposed and can be configured to adjust a liquid discharge direction of the second liquid discharge opening 212.

The cleaning device 1000 further includes a flow division plate 214. The flow division plate 214 is disposed behind the second liquid discharge opening 212.

In some embodiments, an avoidance opening 251a is disposed on the cleaning device body 110, enabling the user to reach into the avoidance opening 251a and grip the first handle 251 to lift the cleaning device 1000.

The cleaning device 1000 further includes a second buoyancy cavity 262. The second buoyancy cavity 262 may be disposed on a side of the first side 113 of the cleaning device body 110, and the side of the first side 113 faces the filtering box 120. The second buoyancy cavity 262 is configured to balance buoyancy forces applied to the front portion and the rear portion of the cleaning device 1000 in the forward direction to prevent the cleaning device 1000 from tilting forward or backward. The second buoyancy cavity 262 may be configured to accommodate liquid and/or gas. The cleaning device 1000 further includes a second buoyancy force adjustment and control part 2621. The second buoyancy force adjustment and control part 2621 may be configured to adjust a volume of the liquid and/or the gas in the second buoyancy cavity 262. The volume of the liquid and/or the gas in the second buoyancy cavity 262 is adjusted by the second buoyancy force adjustment and control part 2621 to balance the buoyancy forces applied to the front portion and the rear portion of the cleaning device 1000.

The cleaning device 1000 further includes a water quality treatment assembly 270. The water quality treatment assembly 270 may be detachably disposed inside the cleaning device body 110. The water quality treatment assembly 270 includes a reagent kit 271 and a reagent drive part (not shown in the figure). The reagent kit 271 is configured to store one or more types of reagents.

The cleaning device 1000 further includes a button 290.

In an embodiment, as shown in FIG. 16, at least one third water discharge opening 1114 is further disposed at the bottom of the housing of the cleaning device body, so that when the cleaning device is lifted out of the water surface, water in the traveling mechanism can be quickly discharged from the cleaning device. The third water discharge opening 1114 is disposed at a position on the bottom of the housing of the cleaning device body, where the position is close to the track 193, and the third water discharge opening 1114 communicates with the internal space of the traveling mechanism, so that when the cleaning device is lifted out of the water surface, the water in the traveling mechanism can be quickly discharged. When the cleaning device moves, a projection of the third water discharge opening on the travel surface is located within the projection of the track 193 on the travel surface. When a plurality of third water discharge openings 1114 are disposed, the plurality of third water discharge openings 1114 may be arranged, for example, in one or more rows, and projections of the plurality of third water discharge openings 1114 on the travel surface are all located within the projection of the track 193 on the travel surface.

Figure 17:
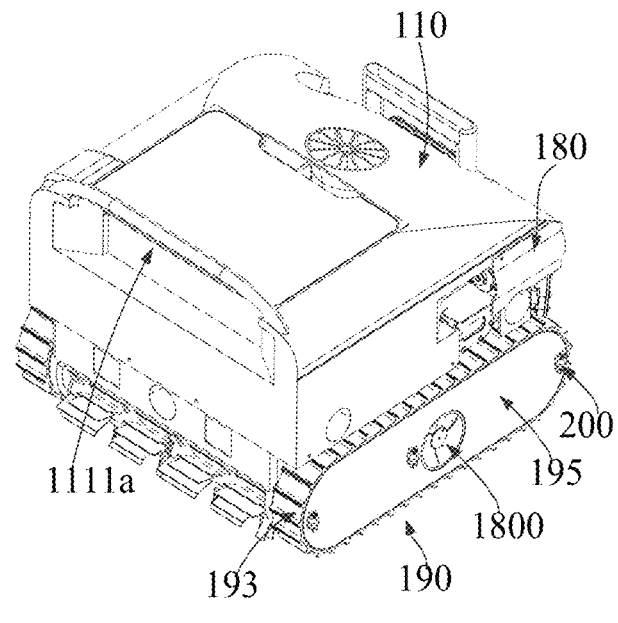
FIG. 17 is a schematic structural diagram of a cleaning device according to the present disclosure.
Figure 18:
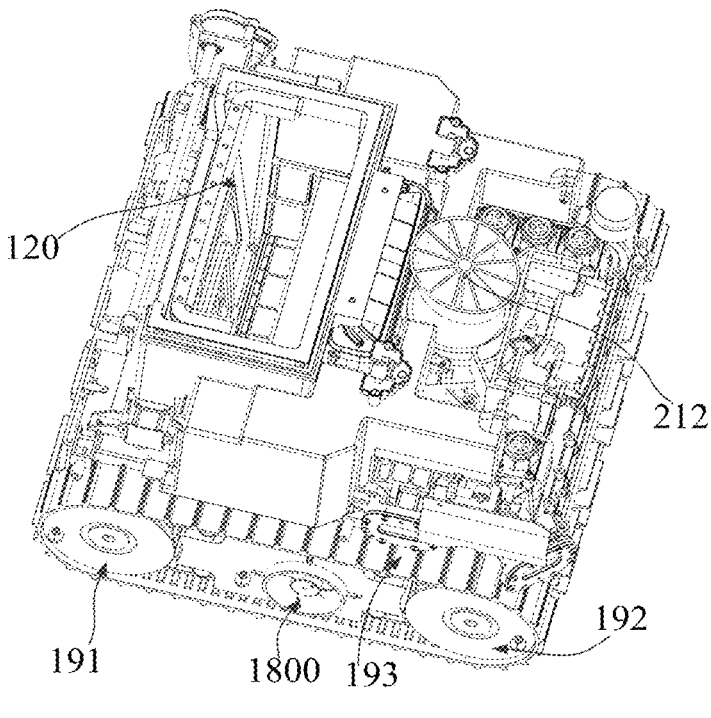
FIG. 18 is a schematic diagram of a cleaning device after some components are removed according to the present disclosure.

As shown in FIG. 17 and FIG. 18, the propulsion assembly further includes a lateral propulsion mechanism 1800. The lateral propulsion mechanism 1800 may be disposed on a side portion, the top, or the bottom of the cleaning device body 110. The lateral propulsion mechanism 1800 includes a fluid inlet and a fluid ejection outlet. Liquid enters the lateral propulsion mechanism 1800 through the fluid inlet and is ejected through the fluid ejection outlet in a direction away from the side portion of the cleaning device body 110. The ejected liquid applies a first thrust to the cleaning device. The first thrust may at least provide a thrust component in a lateral direction of the cleaning device for the cleaning device 1000, enabling the cleaning device 1000 to be close to a side wall of a pool when the cleaning device 1000 moves along the side wall of the pool in a third motion state or/and enabling the cleaning device 1000 to laterally move along a waterline in a second motion state to clean the waterline.

The second motion state includes at least a state in which the cleaning device operates on the wall of the pool or operates in a direction parallel to the wall of the pool. The third motion state includes at least a state in which the cleaning device operates on the water surface.

In one embodiment, the lateral propulsion mechanism 1800 is located below the electronic control box 220 and disposed in a second cavity 10014b, leading to a compact structure of the cleaning device. In addition, when the first debris inlet 1111a is opened, the lateral propulsion mechanism 1800 is turned on without affecting an amount of water entering through the first debris inlet 1111a. Certainly, the lateral propulsion mechanism 1800 may alternatively be disposed at another position on the cleaning device. The lateral propulsion mechanism 1800 may be used during cleaning the water surface along an edge or/and may be further used during cleaning the bottom wall of the pool along an edge.

For example, when the cleaning device body 110 moves along the wall of the pool, the lateral propulsion mechanism 1800 may be disposed on a side of the cleaning device body 110, and the side of the cleaning device body is away from the wall of the pool. The lateral propulsion mechanism 1800 operates to at least provide a thrust component directed toward the wall, enabling the cleaning device 1000 to better move along an edge of the wall of the pool. Specifically, if the edge of the pool is irregular, for example, the edge has an irregular protrusion or recess, when the cleaning device 1000 moves along the edge in the third motion state, due to a first propeller, it is difficult for the cleaning device 1000 to precisely control an action of the cleaning device with the help of the sensing assembly, leading to a poor moving-along-the-edge effect. In this case, the lateral propulsion mechanism 1800 is disposed on a side of the cleaning device 1000, where the side is away from the edge of the pool, to generate a thrust component directed toward the edge of the pool, so that the cleaning device 1000 can be better controlled to operate based on the shape of the edge of the pool. The cleaning device 1000 can be pushed toward the edge of the pool under the thrust component in real time. When the cleaning device 1000 cleans the waterline along the wall of the pool in the second motion state, the lateral direction of the cleaning device 1000 and the waterline are roughly parallel to each other or form a specific angle. The lateral propulsion mechanism 1800 provides a lateral thrust, enabling the cleaning device 1000 to sweep past the waterline in a substantially lateral direction, so that the waterline is cleaned.

Based on a cleaning requirement, at least one lateral propulsion mechanism 1800 may be disposed on one side portion or each of two side portions of the cleaning device 1000. The lateral propulsion mechanism 1800 may be, but is not limited to, a propeller or a water ejector. Certainly, the lateral propulsion mechanism 1800 may be disposed at any position on the cleaning device body 110, provided that the lateral propulsion mechanism conveniently provides a thrust. The lateral direction may be defined as a direction indicated by a connection line between centers of a left side and a right side of the cleaning device 1000.

Specifically, when the cleaning device body 110 moves along an edge in the third motion state, the first thrust provided by the lateral propulsion mechanism 1800 enables the cleaning device body 110 to move closely along the edge. This avoids the following case: The cleaning device body 110 cannot properly move along the edge due to large edge curvature, an excessively large angle, or a missing edge, and then the cleaning device body moves to a non-edge region due to inertia, leading to missed cleaning. Optionally, the lateral propulsion mechanism 1800 may be disposed at a position on the left side and/or the right side of the cleaning device 1000, where the position is close to the front side of the cleaning device. A water ejection direction of the lateral propulsion mechanism 1800 forms an angle with the side (namely, a side wall, of the cleaning device, on which the lateral propulsion mechanism 1800 is located) and is directed toward the target region, so that a direction of the first thrust provided by the lateral propulsion mechanism 1800 for the cleaning device is opposite to the water ejection direction of the lateral propulsion mechanism. The first thrust has a component in the lateral direction of the cleaning device 1000. A direction of the component is parallel to the central plane α, so that the front side of the cleaning device body 110 is closely attached to the edge in time. This further improves accuracy of the cleaning device 1000 in moving along the edge. Certainly, the lateral propulsion mechanism 1800 may be disposed at a middle position or a rear position on the left side portion or the right side portion of the cleaning device, so that the cleaning device body can be closely attached to or close to the edge of the side wall of the pool.

Figure 19:
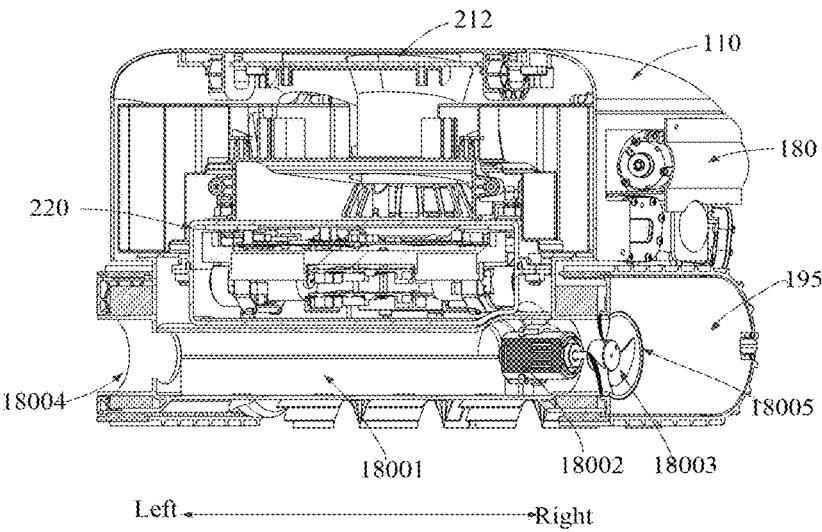
FIG. 19 is a schematic structural diagram of a horizontal section of a cleaning device according to the present disclosure.
Figure 20:
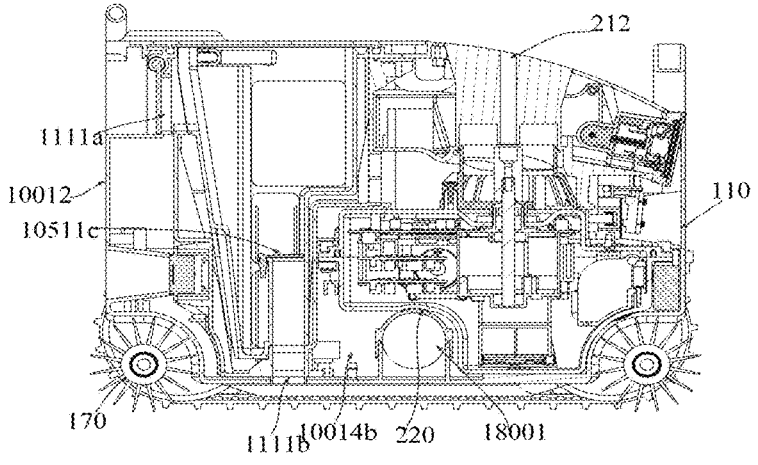
FIG. 20 is a schematic structural diagram of a longitudinal section of a cleaning device according to the present disclosure.

In one embodiment, as shown in FIG. 19, the lateral propulsion mechanism 1800 includes a lateral flow channel 18001 disposed on the cleaning device body in the lateral direction. Two ends of the lateral flow channel 18001 run through the two lateral side walls of the cleaning device body and communicate with the outside. Ports at the two ends of the lateral flow channel 18001 respectively serve as a third opening 18004 and a fourth opening 18005. One of the third opening 18004 and the fourth opening 18005 serves as the fluid inlet, and the other serves as the fluid ejection outlet. The lateral propulsion mechanism 1800 further includes a lateral impeller 18003 and a lateral motor 18002 configured to drive the lateral impeller 18003 to rotate. Both the lateral impeller 18003 and the lateral motor 18002 are disposed in the lateral flow channel 18001. As shown in FIG. 19, when the cleaning device moves along a left edge, the third opening 18004 serves as the fluid inlet, and the fourth opening 18005 serves as the fluid ejection outlet. To generate a larger first thrust directed toward the left side on the right side of the cleaning device, the lateral impeller 18003 and lateral motor 18002 may optionally be disposed on a right side of the lateral flow channel 18001 and close to the fourth opening. In this way, when the lateral motor rotates forward to drive the impeller to rotate, the first thrust generated by the liquid ejected through the fluid ejection outlet can be maximized. Certainly, the lateral impeller and lateral motor may alternatively be disposed at a middle position on the lateral flow channel 18001 or close to a left side of the lateral flow channel 18001. In this way, the cleaning device can move along a right edge. For example, a rotation direction of the lateral motor 18002 is changed. When the lateral motor 18002 rotates reversely, the third opening serves as the fluid ejection outlet, and the fourth opening serves as the fluid inlet. In this way, the liquid is ejected through the third opening toward the left side to generate the first thrust directed toward the right side of the cleaning device, so that the cleaning device can move along the right edge.

Similarly, if the cleaning device moves along the right edge, the lateral impeller and the lateral motor may be disposed on the left side of the lateral flow channel 18001 to generate a larger first thrust directed toward the right side on the left side of the cleaning device.

In one embodiment, the lateral propulsion mechanism 1800 runs through and is disposed between two side surfaces of the cleaning device. The third opening 18004 is disposed on one side surface, and the fourth opening 18005 is disposed on the other side surface. In the height direction of the cleaning device, the third opening and/or the fourth opening are/is located within a range of the traveling mechanism. For example, as shown in FIG. 18, each of the two ends of the lateral flow channel 18001 is located in an annular region 1173 of one traveling mechanism without occupying another space on the cleaning device body, so that a structure of the cleaning device is more compact, and a size of the cleaning device is smaller while the cleaning device can move along the edge. When the cover plate 195 is disposed, an avoidance hole or an avoidance grill is disposed on the cover plate 195 to expose both the third opening and the fourth opening, so that the two ends of the lateral flow channel 18001 can communicate with the liquid in the pool.

When the cleaning device body 110 moves on the wall of the pool, that is, the cleaning device is in the second motion state, for example, cleaning the waterline, the lateral propulsion mechanism 1800 is disposed, so that the cleaning device body 110 can move leftward or rightward on the wall of the pool to laterally clean the waterline. In addition, the cleaning device can move leftward or rightward while the cleaning device moves upward or downward. This improves motion flexibility of the cleaning device 1000.

In one embodiment, a sensing assembly is disposed on the cleaning device body 110 and is configured to detect or control the cleaning device 1000 to move along an edge in a preset manner. The sensing assembly may include at least one of a vision sensing assembly 1123, an ultrasonic sensing assembly, or an infrared sensing assembly disposed on a side portion, the top, or the bottom of the cleaning device body 110. The sensing assembly is electrically connected to the control system 231 of the cleaning device 1000. When the sensing assembly detects that the cleaning device 1000 deviates from the edge of the pool in a moving process, the control system 231 increases or decreases ejection power of the fluid ejection outlet of the lateral propulsion mechanism 1800, enabling the cleaning device 1000 to move close to or slightly away from the edge of the pool.

The above description describes only implementations of the present disclosure and is not intended to limit the scope of the present disclosure. Any equivalent structure or equivalent process transformation performed based on the contents of this specification and the accompanying drawings of the present disclosure or applied directly or indirectly in other related technical fields shall fall within the protection scope of the present disclosure.

The invention claimed is:

1. A cleaning device, comprising: a device body;
a traveling mechanism, wherein the traveling mechanism is disposed on each of two sides of the device body and is configured to drive the cleaning device to move on a to-be-cleaned surface, wherein the traveling mechanism comprises a cover plate, wherein a grill is formed on at least a part of the cover plate and is configured to allow liquid to flow out of the cleaning device;
a filtering box, wherein the filtering box is at least partially detachably disposed in the device body;
at least one debris inlet, wherein the at least one debris inlet is disposed at a bottom or a side portion of the device body and is configured to allow water to flow into the filtering box for filtration;
a main drive pump, wherein the main drive pump is disposed in the device body and is configured to provide power for the water to flow through the at least one debris inlet and the filtering box;
a camera unit further disposed on the device body, wherein the camera unit is disposed on a front side of the cleaning device;
a light supplement part further disposed on the device body, configured to adjust brightness of a region captured by the camera unit; and
a first identification assembly further disposed on the device body, wherein the first identification assembly is disposed on the front side of the cleaning device and is configured to detect a distance between an obstacle and the first identification assembly, wherein the first identification assembly and the camera unit are disposed on the front side of the cleaning device at different heights.

2. The cleaning device according to claim 1, wherein the light supplement part comprises two light supplement parts substantially symmetrically disposed on two sides of the camera unit.

3. The cleaning device according to claim 1, wherein the camera unit and the light supplement part are disposed in an accommodating cabin, wherein the accommodating cabin is fixedly disposed in an accommodating cavity of the device body.

4. The cleaning device according to claim 1, wherein a second identification assembly is further disposed on the cleaning device, wherein the second identification assembly is disposed at a side portion of the device body and is configured to detect a distance between the second identification assembly and an obstacle on a side of the second identification assembly.

5. The cleaning device according to claim 1, comprising an adjustment assembly configured to adjust light supplement brightness of the light supplement part based on a brightness degree of an environment in which the cleaning device is located to adjust brightness of a region captured by the camera unit, wherein adjustment of the light supplement brightness comprises at least one of: turning on the light supplement part, turning off the light supplement part, increasing the brightness of the supplement part, or decreasing the brightness of the light supplement part.

6. The cleaning device according to claim 5, wherein when the camera unit is in a dim light or backlight environment, the adjustment assembly is configured to cause the light supplement part to be turned on or the brightness of the light supplement part to be increased based on a brightness degree of light or a backlight degree, and when the camera unit is in a bright light environment, the adjustment assembly is configured to cause the light supplement part to be turned off or the brightness of the light supplement part to be decreased.

7. The cleaning device according to claim 1, wherein the cleaning device further comprises a lateral propulsion mechanism, wherein the grill serves as a fluid ejection outlet of the lateral propulsion mechanism.

8. The cleaning device according to claim 7, wherein the lateral propulsion mechanism comprises a lateral impeller and a lateral motor.

9. The cleaning device according to claim 1, further comprising: a roller brush assembly, wherein the roller brush assembly is disposed at the bottom of the device body;
a second debris inlet, wherein the second debris inlet is disposed at the bottom of the device body and is in fluid communication with the filtering box; and
a topography detection assembly, wherein the topography detection assembly is disposed between the roller brush assembly and the second debris inlet.

10. The cleaning device according to claim 9, wherein there are two topography detection assemblies respectively disposed close to the traveling mechanisms on the two sides of the device body, and at least one of the two topography detection assemblies is an ultrasonic sensor.

11. A cleaning device, comprising:
a device body;
a traveling mechanism, wherein the traveling mechanism is disposed on each of two sides of the device body and is configured to drive the cleaning device to move on a to-be-cleaned surface;
a filtering box, wherein the filtering box is at least partially detachably disposed in the device body;
a first debris inlet, wherein the first debris inlet is disposed at a side portion of the device body and is configured to allow water to flow into the filtering box for filtration;
an auxiliary cleaning assembly disposed at the device body and configured to guide trash in the pool to the first debris inlet and/or clean a pool wall;
a second debris inlet, wherein the second debris inlet is disposed at a bottom of the device body and is configured to allow water to flow into the filtering box for filtration;
a main drive pump, wherein the main drive pump is disposed in the device body and is at least configured to provide power for the water to flow through the second debris inlet and the filtering box;
a camera unit further disposed on the device body, wherein the camera unit is disposed on a front side of the cleaning device;
a topography detection assembly further disposed on the device body, wherein the topography detection assembly is disposed at the bottom of the device body and is configured to detect a topography of the to-be-cleaned surface under the device body; and a transmission channel further disposed on the device body and configured to allow a detection signal of the topography detection assembly to pass therethrough.

12. The cleaning device according to claim 11, further comprising:

a roller brush assembly disposed at the bottom of the device body, wherein the topography detection assembly is disposed between the roller brush assembly and the second debris inlet.

13. The cleaning device according to claim 11, wherein the camera unit is located below the first debris inlet.

14. The cleaning device according to claim 11, further comprising wherein the auxiliary cleaning assembly comprises a side brush, wherein the side brush is rotatably disposed at a joint between two adjacent sides of the device body and is configured to guide at least a part of trash in a target region to a working region of the first debris inlet.

15. The cleaning device according to claim 14, wherein a projection of the side brush on a central plane a of the cleaning device is at least partially located between projections of a first edge and a second edge of the first debris inlet on the central plane a of the cleaning device; or a height of a projection of the side brush on the central plane a of the cleaning device is h1, and a height of the projection of the first debris inlet on the central plane a of the cleaning device is h2 or h3, wherein h1 at least partially overlaps with h2 or h3.

16. The cleaning device according to claim 11, further comprising:

a buoyancy cavity, wherein the buoyancy cavity is configured to accommodate liquid and/or gas; and a buoyancy force adjustment and control part, wherein the buoyancy force adjustment and control part is configured to adjust a volume of the liquid and/or the gas in the buoyancy cavity.

17. The cleaning device according to claim 11, further comprising at least two propulsion assemblies, wherein the at least two propulsion assemblies are respectively disposed on the two sides of the device body.

18. The cleaning device according to claim 11, wherein the transmission channel is in a shape of a truncated cone or a cylinder.

19. The cleaning device according to claim 11, further comprising a light supplement part.

20. The cleaning device according to claim 11, further comprising an identification assembly, wherein the identification assembly is configured to detect a distance between the identification assembly and an obstacle.

* * * * *